(12) United States Patent
Nagaoka et al.

(10) Patent No.: US 7,330,568 B2
(45) Date of Patent: Feb. 12, 2008

(54) DEVICE FOR MONITORING AROUND VEHICLE

(75) Inventors: Nobuharu Nagaoka, Saitama (JP);
Takayuki Tsuji, Saitama (JP);
Masakazu Saka, Saitama (JP);
Masahito Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 692 days.

(21) Appl. No.: 10/801,413

(22) Filed: Mar. 16, 2004

(65) Prior Publication Data

US 2004/0183906 A1    Sep. 23, 2004

(30) Foreign Application Priority Data

Mar. 20, 2003  (JP)  ............................. 2003-078423
Mar. 11, 2004  (JP)  ............................. 2004-068903

(51) Int. Cl.
*G06K 9/00* (2006.01)

(52) U.S. Cl. ...................................... 382/104; 382/103

(58) Field of Classification Search ................ 382/103, 382/104, 115, 224, 190, 191, 225; 340/435, 340/436, 901; 701/301, 302, 28, 70, 223; 348/25, 113, 118
See application file for complete search history.

(56) References Cited

U.S. PATENT DOCUMENTS

| | | | |
|---|---|---|---|
| 6,327,536 B1 * | 12/2001 | Tsuji et al. .................. | 701/301 |
| 6,961,466 B2 * | 11/2005 | Imagawa et al. ........... | 382/190 |
| 2003/0007074 A1 | 1/2003 | Nagaoka et al. | |
| 2003/0138133 A1 * | 7/2003 | Nagaoka et al. ............ | 382/104 |
| 2006/0177097 A1 * | 8/2006 | Fujimura et al. ........... | 382/103 |

FOREIGN PATENT DOCUMENTS

| | | |
|---|---|---|
| DE | 100 30 421 A 1 | 1/2001 |
| DE | 102 28 638 A 1 | 1/2003 |
| JP | 11-328364 | 11/1999 |
| JP | 2003-006642 | 1/2003 |
| JP | 2003-028635 | 1/2003 |

OTHER PUBLICATIONS

K. Huggle and W. Eckstein, "Extraktion von Personen in Videobildern"—English translation for relevant part is attached.

* cited by examiner

*Primary Examiner*—Jingge Wu
*Assistant Examiner*—Claire Wang
(74) *Attorney, Agent, or Firm*—Carrier, Blackman & Associates, P.C.; Joseph P. Carrier; William D. Blackman

(57) ABSTRACT

A device for monitoring around a vehicle capable of detecting objects present around the vehicle based on an image captured by at least one infrared camera member provided with the vehicle. An area which is inferred to correspond to the pedestrian's head is established as a reference area. Two object areas are established above the reference area so as to correspond to spaces above the shoulders on both sides of the pedestrian's head. An area which corresponds to the head and the shoulders in an infra-red ray image is acknowledged. Another object area which is inferred to correspond to the shoulders and arms of the pedestrian is established. If a distance from an entire pedestrian and a distance from an area which corresponds to the shoulders and arms are equal, it is acknowledged that a binary object including the area which corresponds to the shoulders and arms indicates a pedestrian.

17 Claims, 19 Drawing Sheets

ARTICLES IN FRAMES P1 TO P4 ARE OBJECTS TO BE ANALYZED

P1: COORDINATES OF UPPER END POSITION OF OBJECT
HEIGHT OF OBJECT $\Delta Hg$ [m]
MEAN LUMINANCE OF AREA1 Ave_A1
LUMINANCE DISPERSION OF AREA2 Var_A2
LUMINANCE DISPERSION OF AREA3 Var_A3

DEVICE FOR MONITORING AROUND VEHICLE

The present application is based on patent applications No. 2003-078423 filed in Japan Mar. 20, 2003, and 2004-68903 filed in Japan Mar. 11, 2004 the content of which are incorporated herein by reference.

BACKGROUND OF THE INVENTION

1. Field of the Invention

The present invention relates to devices for monitoring around a vehicle in which target extraction is carried out by subjecting an image captured by an infrared camera device to a binary thresholding method.

2. Description of Related Art

Devices for monitoring around a vehicle have been proposed in which objects that may collide with the vehicle, such as pedestrians, are extracted from a picture around the vehicle captured by an infrared camera, and such information is supplied to a driver of the vehicle. In these devices, the probability that the vehicle will hit an object, such as a pedestrian, is calculated based on the relative distance between the vehicle and the object, and the relative speed of the vehicle.

An example of such devices for monitoring around a vehicle which extract an object, which may collide with the vehicle, from an image around the vehicle captured by an infrared camera is as follows. That is, in the device, the captured infrared image is subjected to a binary (2-level) thresholding process, and an area to which bright (white) portions are concentrated is searched for. Then, it is determined whether the area is a head portion of a pedestrian by using the aspect ratio (ratio of length to width) and the sufficiency rate of the area, and further calculating the distance between the vehicle and the area using the actual surface area and the position of the center of gravity in the image. If the area of the head portion of a pedestrian is determined, an area which forms the body of the pedestrian is determined by calculating the height of the pedestrian in the image based on the distance between the area determined to be the head portion and the camera, and an average height of an adult. These areas are displayed to be distinguished from the other regions of the image. In this manner, the position of the entire body of the pedestrian in the infrared image is determined, and this information is displayed for the driver so as to effectively assist the vision of the driver (refer to Japanese Unexamined Patent Application, First Publication No. Hei 11-328364, for example).

However, using the thresholding method, only the head portion, a part of the head portion, or the entire or only an upper half or a lower half of the body, of a pedestrian may be extracted from an infrared image, depending on the effects of a hat or clothing the pedestrian is wearing, or of the environment surrounding the pedestrian, and thus the shape of the pedestrian obtained by the binary thresholding method becomes ambiguous. Also, when a vehicle is running, due to the influence in change in the shape of a road ahead, or the pitting of the vehicle, the height of a pedestrian, from a child to an adult, is generally detected to be different from his/her real height.

Accordingly, since the barycentric coordinates of targeted objects, such as pedestrians, in the picture cannot be fixed with respect to the distance. Therefore, it is not possible to extract the targeted objects stably such as pedestrians which may collide with the vehicle, if the extraction is carried out based on the shape of at least the pedestrians' height, head, body as in the above-mentioned conventional device.

SUMMARY OF THE INVENTION

The present invention takes into consideration the above-mentioned circumstances, and has as an object to provide a device for monitoring around a vehicle in which unclear images of objects obtained by subjecting to a binary thresholding method, which are extracted from a picture taken by a camera, are accurately determined to carry out a stable extraction of targeted objects, such as pedestrians. Other objects and features of the invention will be understood from the following description with reference to the accompanying drawings.

In order to achieve the above objects, the present invention provides a device for monitoring around a vehicle capable of detecting objects present around the vehicle based on an image captured by at least one infrared camera member provided with said vehicle such that said device comprises a pedestrian's head area calculating unit (for example, Steps S91 to S94 in the embodiment of the present invention) which establishes an area which is supposed to correspond to a head of the pedestrian as a reference area, a pedestrian's over-shoulder area calculating unit (for example, Step S95 in the embodiment of the present invention) which establishes two object areas which are supposed to correspond to over-shoulder areas of the pedestrian on both sides of the reference area, and a pedestrian's shape acknowledging unit (for example, Steps S96, S98, and S100 in the embodiment of the present invention) which acknowledges the pedestrian who is in the captured image according to a feature in a luminance in the reference areas and a feature in a luminance in the object areas.

According to the device for monitoring around a vehicle described above, the device for monitoring around a vehicle establishes an area which is supposed to correspond to a head of a pedestrian as a reference area by a pedestrian's head area calculating unit due to a theory that the head of the pedestrian has a high luminance in an image which is captured by an infrared ray camera. Next, two object areas which are supposed to correspond to over-shoulder areas of the pedestrian are established on both sides of the reference area by the pedestrian's over-shoulder area calculating unit. By doing this, the pedestrian's shape acknowledging unit can acknowledge the area which is supposed to correspond to the head and the shoulders of the pedestrian who is in the image which is captured by the infra-red ray camera due to a theory that a the head of the pedestrian has a high luminance contrast with reference to a luminance contrast besides the head (background) in upward spaces over the shoulders according to a feature in a luminance in the reference area and a feature in a luminance in the object areas.

In accordance with another aspect of the present invention, it is characterized in that, in the device for monitoring around a vehicle, the object areas are offset upwardly from the reference area.

In the device for monitoring around a vehicle which is provided with above structure, it is possible to prevent an image which belongs to an area which is different from the targeted area from entering the targeted area because of object incline in the infra-red ray image.

A device for monitoring around a vehicle further comprises a pedestrian's shoulder area calculating unit (for example, Steps S97 and S99 in the embodiment of the present invention) which establishes other object areas for acknowledging the pedestrian's arms downwardly to the object areas, respectively, such that the pedestrian's shape acknowledging unit acknowledges the pedestrian in the captured image according to a feature in a luminance in the object areas and the other object areas.

The device for monitoring around a vehicle having the above structure compares the object areas which are supposed to correspond to spaces which are established on both sides of the reference area above pedestrian's shoulders and another object area which is supposed to correspond to the pedestrian's shoulders and arms which is established by the pedestrian's shoulder area calculating unit. Thus, the pedestrian's shape acknowledging unit can acknowledge an area which is supposed to correspond to the shoulders and arms of the pedestrian who is in an image which is captured by an infra-red ray camera due to a theory that a luminance contrast for the shoulders and the arms of the pedestrian is different from a luminance contrast in a background in both sides the head which is positioned in spaces above the shoulders.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Figure 1:
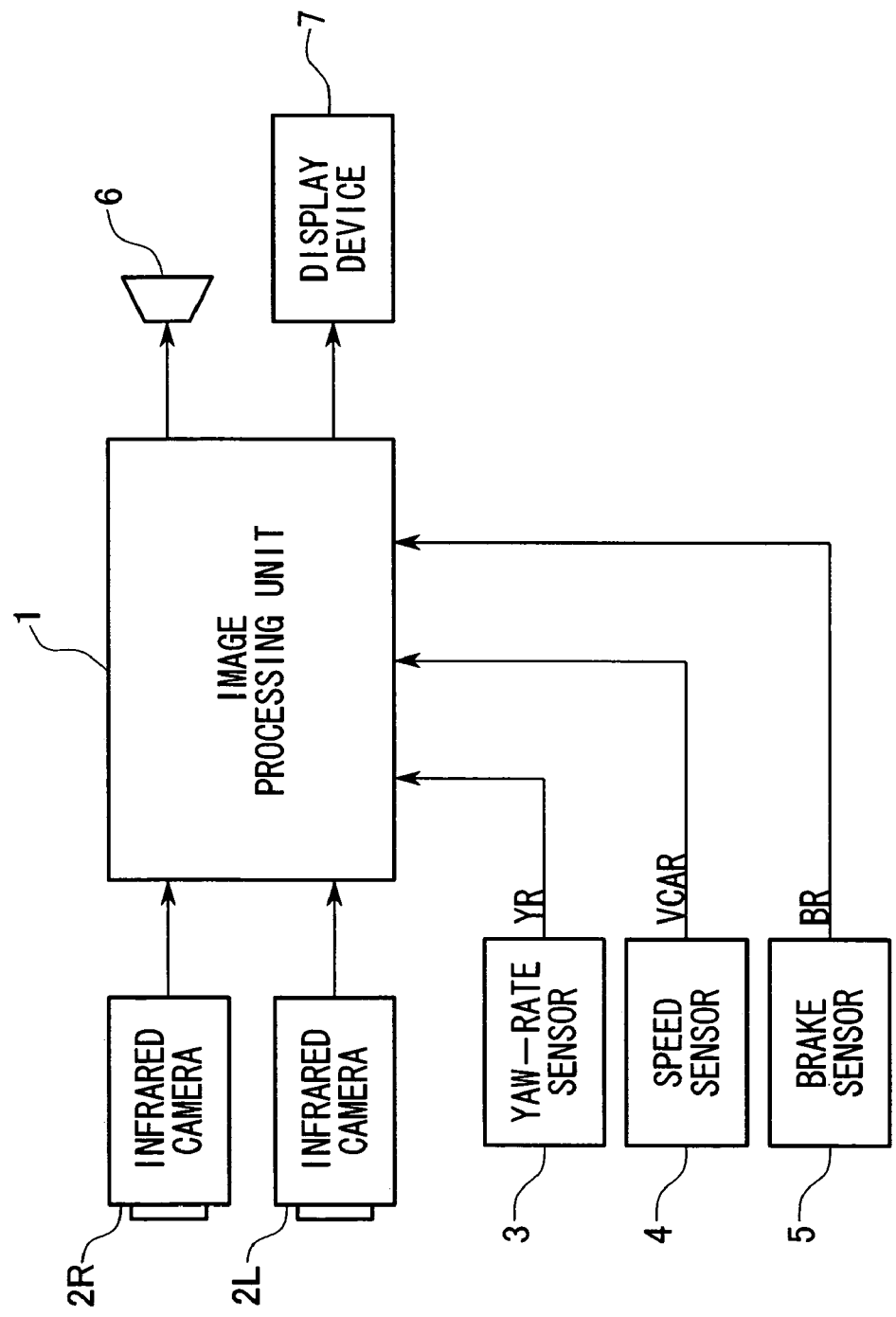
FIG. 1 is a block diagram showing a structure of a device for monitoring around a vehicle according to an embodiment of the present invention.

FIG. 1 is a block diagram showing a configuration of a device for monitoring around a vehicle according to an embodiment of the present invention.

In FIG. 1, the reference numeral 1 indicates an image processing unit including a central processing unit (CPU) which controls the device for monitoring around a vehicle according to the embodiment. To the image processing unit 1, two infrared cameras 2R and 2L capable of detecting far infrared radiations, a yaw-rate sensor 3 which detects the yaw-rate of the vehicle, a speed sensor 4 which detects the running rate (speed) of the vehicle, and a brake sensor 5 for detecting brake operation are connected. In this configuration, the image processing unit 1 detects pedestrians or animals in front of the vehicle based on an infrared image around the vehicle and signals indicating the running state of the vehicle, and generates an alarm when it is determined that the possibility of collision is high.

Also, to the image processing unit 1, a speaker 6 for generating an alarm sound, and an image display device 7, which displays images captured by the infrared cameras 2R and 2L and makes the driver of the vehicle recognize objects which may be hit by the vehicle, are connected. The image display device 7 may include, for instance, a display combined with a meter which shows the driving state of the vehicle using numbers, a navigation display provided with the console of the vehicle, and/or a heads up display (HUD) 7a which displays information at a position in the front window where the sight of the driver is not interfered with.

Moreover, the image processing unit 1 may further include an A/D converting circuit which converts input analog signals into digital signals, an image memory which stores digitalized image signals, a central processing unit (CPU) which performs various operations, a random access memory (RAM) which is used for storing data being operated by the CPU, a read only memory (ROM) which stores programs, tables, maps, etc., performed by the CPU, and output circuits through which driving signals for the speaker 6, display signals for the HUD 7a, etc., are output. Accordingly, signals output from each of the infrared cameras 2R and 2L, the yaw-rate sensor 3, the speed sensor 4 and the brake sensor 5 are converted to digital signals and are input into the CPU.

Figure 2:
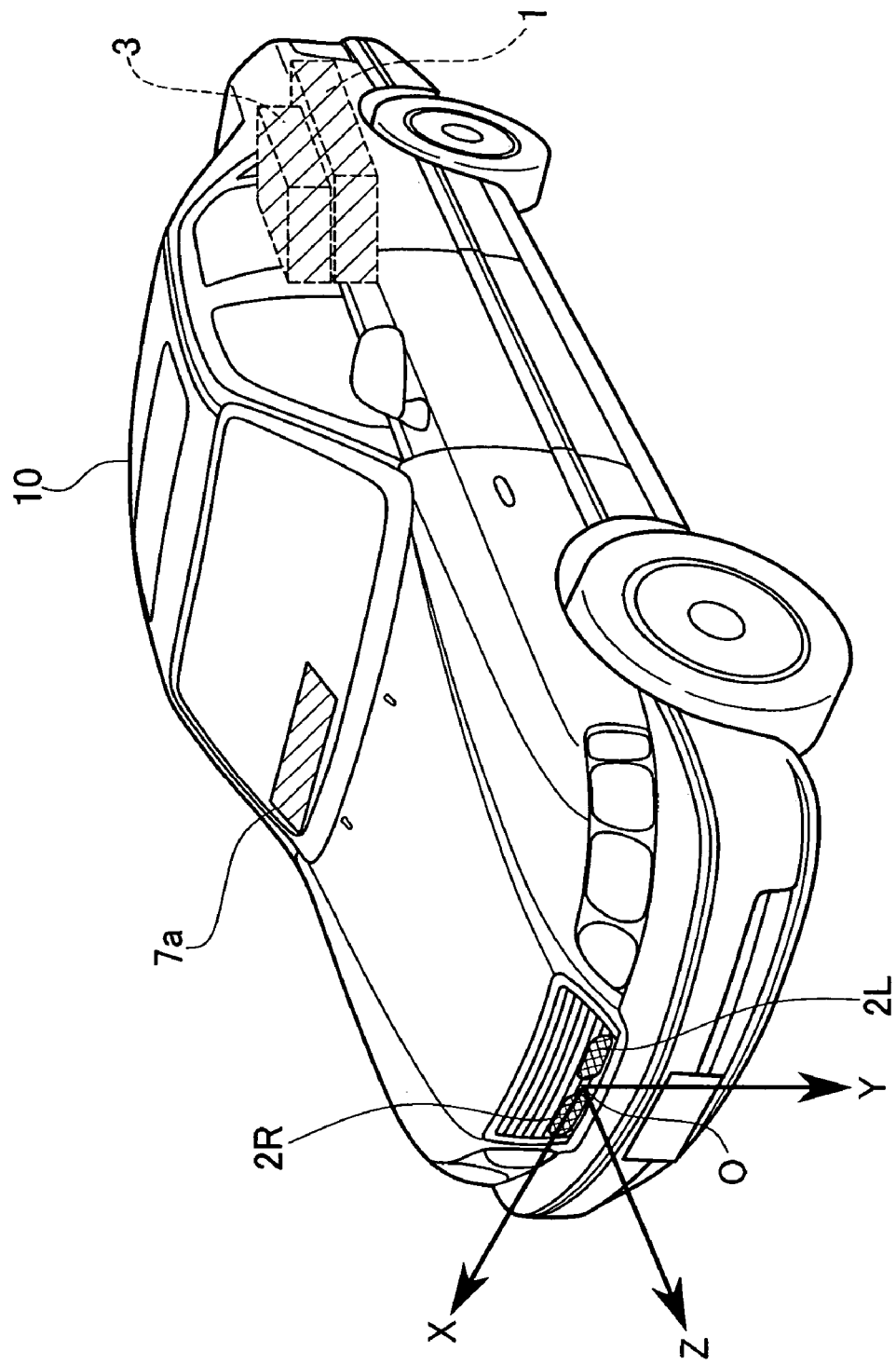
FIG. 2 is a perspective diagram showing positions of an infrared ray camera, a sensor, a display, etc., attached to a vehicle according to the embodiment of the present invention.

Also, as shown in FIG. 2, the infrared cameras 2R and 2L are disposed at the front of a vehicle 10 at symmetrical positions with respect to the center of the vehicle 10 in the width direction so that the optical axis of each of the infrared cameras 2R and 2L become parallel to each other, and the height of the cameras 2R and 2L from the surface of the road become equal. Note that each of the infrared cameras 2R and 2L has characteristics such that the level of output signal becomes higher (i.e., luminance increases) as the temperature of an object increases.

Moreover, the display panel of the HUD 7a is disposed at a position of the windshield of the vehicle 10 where the sight of the driver is not interfered with the display panel.

Next, operation of the device for monitoring around a vehicle according to the embodiment of the present invention will be explained with reference to the accompanying drawings.

Figure 3:
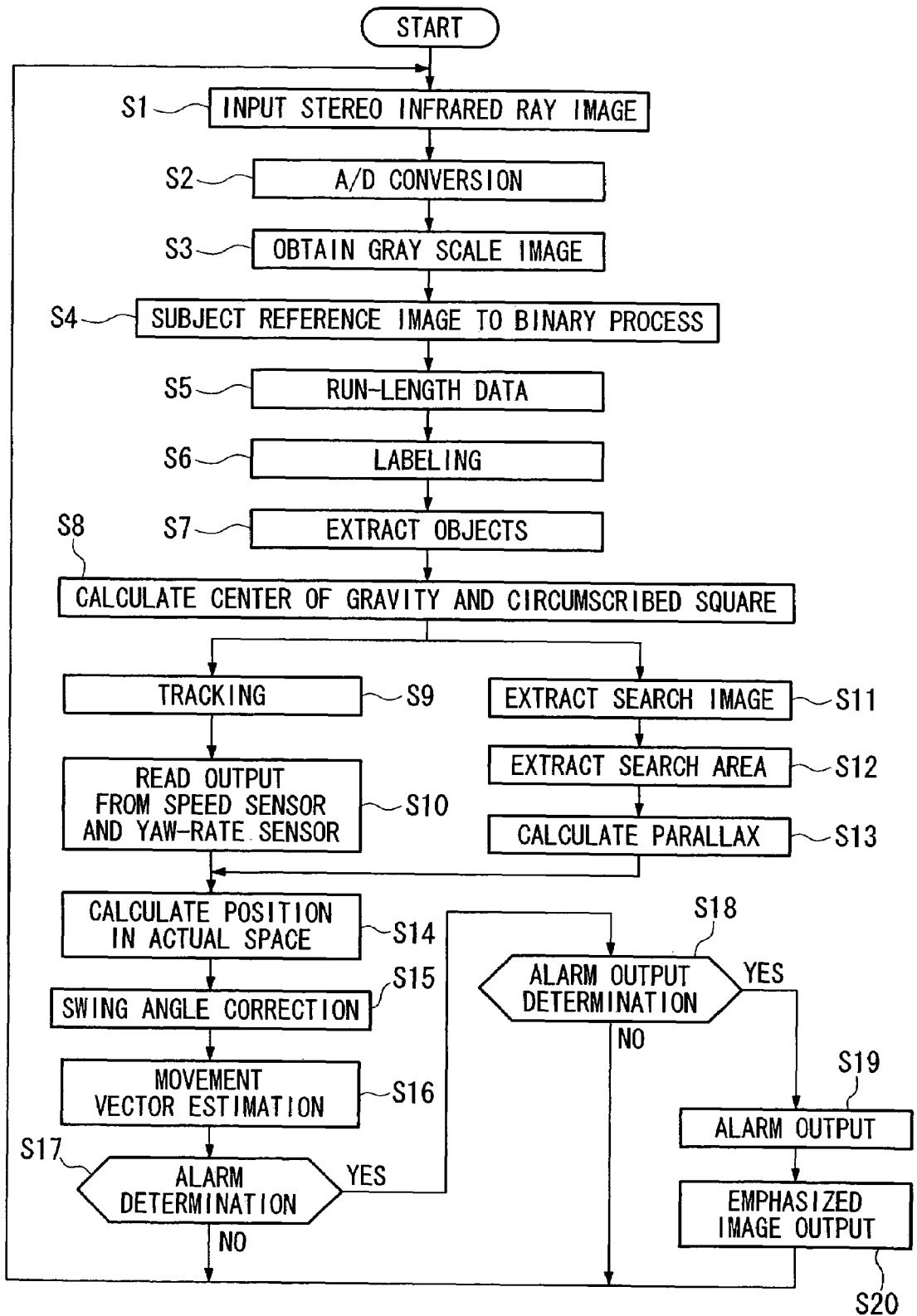
FIG. 3 is a flowchart for showing an object detection and alarming operation of the device for monitoring around a vehicle according to the embodiment of the present invention.

FIG. 3 is a flowchart showing operations for detecting a targeting object, such as a pedestrian, and for generating an alarm, which are performed in the image processing unit 1 of the device for monitoring around a vehicle according to the embodiment of the present invention.

First, the image processing unit 1 obtains an infrared image (step S1), which is output signals from the infrared cameras 2R and 2L, subjects the signals to an A/D conversion process (step S2), and stores the obtained gray scale image in an image memory (step S3). Note that in this embodiment, the right hand side image is obtained by the infrared camera 2R, and the left hand side image is obtained by the infrared camera 2L. Also, since the horizontal position of the same object in the right hand side image and the left hand side image is shifted from each other when the images are displayed, it is possible to calculate the distance to the targeting object based on the shift (parallax).

After the gray scale image is obtained in step S3, the right hand side image obtained by the infrared camera 2R is used as a reference image, and the image signals thereof is subjected to a binary thresholding process, i.e., a process in which an area whose luminance is higher than a threshold value ITH is set to be "1" (white), and an area whose luminance is less than the threshold value ITH is set to be "0" (black) (step S4).

Figure 4A:
FIGS. 4A and 4B are diagrams showing a gray scale image obtained by using an infrared camera, and a binary image thereof, respectively.
Figure 4B:

FIG. 4A shows a gray scale image obtained using the infrared camera 2R, and an image shown in FIG. 4B is obtained by subjecting the gray scale image shown in FIG. 4A to the binary thresholding process. Note that in FIG. 4B, objects indicated in each of the frames P1-P4 are targeted objects (hereinafter also referred to as "high luminance areas"), which are shown in white in the displayed picture.

After image data subjected to the thresholding process is obtained from the infrared image, a process is performed in which the obtained imaged data is converted to run-length data (step S5). Lines that are expressed by the run-length data are formed by areas that have become white due to the thresholding process at pixel level. Each of the lines has a width of one pixel in the y-direction, and has a length corresponding to the length of a pixel which forms the run-length data in the x-direction.

Next, objects in the image data converted to the run-length data are labeled (step S6) so that an extraction process for the objects may be carried out (step S7). That is, among the lines expressed as the run-length data, by regarding a line having a portion superimposed in the y-direction as an object, each of the high luminance areas P1-P4 shown in FIG. 4B, for example, can be recognized as a targeted object (targeted binary object).

After the extraction of the targeted objects is completed, the center of gravity G, the surface area S, and the aspect ratio (ratio of length to width) of a circumscribed square are calculated (step S8).

In this embodiment, the surface area S is calculated by assuming the run-length data of an object of label A as (x [i], y [i], run [i], A) (i=0, 1, 2, ... N−1), and accumulating the lengths of the run-length data (run [i]−1) for the same object (N run-length data). Also, the coordinates (xc, yc) of the center of gravity G of the object A is calculated by multiplying the length of each run-length data (run [i]−1) by the coordinate x[i] or y[i] of each of the run-length data, further multiplying the resultant value by each other for the same object, and dividing the obtained value by the surface area S.

Moreover, the aspect ratio is calculated as the ratio of Dy/Dx where Dy is the length of the circumscribed square for the object in the longitudinal direction, and Dx is the length of the circumscribed square for the same object in the transverse direction.

Note that since the run-length data is expressed as a pixel number (a coordinate number) (=run [i]), it is necessary to subtract one to obtain the actual length (=run [i]−1). Also, it is possible to substitute the position of the center of gravity of the circumscribed square for the position of the center of gravity G.

After the center of gravity, the surface area, and the aspect ratio of the circumscribed square are calculated, and a process for tracking the object in relation to time, i.e., a process in which the same object is recognized every sampling period, is carried out (step S9). In the tracking process in relation to time, objects A and B are extracted at time k, which is obtained by discretization of analog time t using the sampling period, for instance, and it is determined if objects C and D, which are extracted at time (k+1), are the same objects as the objects A and B, respectively. Then, if it is determined that the objects A and B and the objects C and D are the same objects, labels of the objects C and D are changed to label A and B, respectively, to carry out the tracking process in relation to time.

Also, the positional coordinates of each of the (center of gravity of) objects thus recognized are stored in memory as time series positional data, and are used for the subsequent operation process.

Note that the processes in steps S4-S9 explained above are carried out for the binary reference image (the right hand side image in this embodiment).

Then, the vehicle speed VCAR detected by the speed sensor 4, and the yaw-rate YR detected by the yaw-rate sensor 3 are read, and the swinging angle θr of the vehicle 10 is calculated by subjecting the yaw-rate YR to time integration (step S10).

On the other hand, a process for calculating the distance z between the targeting object and the vehicle 10 (steps S11-S13) is carried out simultaneously with the process of steps S9 and S10. Since this process for calculating the distance z takes a longer time period than the time required in steps S9 and S10, it is carried out using longer time than steps S9 and S10 (about three times longer than the time for carrying out steps S1-S10, for instance).

First, one of the objects which are tracked using the binary image of the reference image (the right hand side image), is selected to extract a search image R1 (in this embodiment, the whole area surrounded by the circumscribed square is regarded as the search image) from the right hand side image (step S11).

Then, a search area from which an image corresponding to the search image R1 (hereinafter also referred to as a "corresponding image") is searched, is set in the left hand side image, and the corresponding image is extracted by carrying out a correlation operation (step S12). More specifically, a search area R2 is set in the left hand side image in accordance with each peak coordinate of the search image R1, and a luminance difference-summed value C (a, b), which shows the degree of correlation with the search image R1 within the search area R2, is calculated. The area at which the summed value C (a, b) is minimum is extracted as the corresponding image. Note that the correlation operation is performed using the gray scale image, not the binary image.

Also, when there is a previous positional data for the same object, an area R2a, which is narrower than the search area R2, is set as a search area based on the previous positional data.

Since the search image R1 and the corresponding image R4, which corresponds to the search image R1, are extracted in the reference image (the right hand side image) and the left hand side image, respectively, in step S12, the position of the center of gravity of the search image R1 and that of the corresponding image R4, and the degree of parallax $\Delta d$ (pixel number) are obtained, and the distance z between the vehicle 10 and the object may be calculated using these factors (in step S13).

Then, after the calculation of the swing angle $\theta r$ in step S10, and the calculation of the distance between the object in step S13 are completed, the coordinate (x, y) in the image and the distance z are converted to obtain the coordinate (X, Y, Z) of the real space (in step S14).

In this embodiment, the coordinate (X, Y, Z) of the real space is defined as shown in FIG. 2 with the origin O which corresponds to the middle position of the attaching positions for the infrared cameras 2R and 2L (the position fixed to the vehicle 10). The coordinate in the image, on the other hand, is defined so that the horizontal direction with respect to the origin, which is the center of the image, become x, and the vertical direction become y.

When the coordinate in the real space is obtained, a swing angle correction process for correcting the positional shift in the image caused by the swing of the vehicle 10 is carried out (in step S15). That is, if the (front portion of the) vehicle 10 is rotated in the left hand side direction at an angle of $\theta r$ from time k to (k+1), the range of the image obtained through the cameras shifts in the x direction by $\Delta x$, and this shift is corrected in the swing angle correction process.

Note that in the following explanation, the coordinate after the swing angle correction process is expressed as (X, Y, Z).

After the swing angle correction is completed for the real space coordinate, an approximation straight line LMV, which corresponds to a vector of the relative movement between the object and the vehicle 10, is obtained from N real space positional data (N=about 10, for example) subjected to the swing angle correction process, which is obtained within the monitoring period of $\Delta T$ for the same object, i.e., the time series data.

Then, the newest positional coordinate P(0)=(X(0), Y(0), Z(0)) and the positional coordinate P(N-1)=(X(N-1), Y(N-1), Z(N-1)) prior to (N-1) sampling (i.e., before time $\Delta T$) are corrected to be on the approximation straight line LMV, and the positional coordinate after the correction, Pv (0)=(Xv(0), Yv(0), Zv(0)) and Pv (N-1)=(Xv(N-1), Yv(N-1), Zv(N-1)) are obtained.

In this manner, the relative movement vector may be obtained as a vector directed to Pv(0) from the positional coordinate Pv(N-1) (in step S16).

As explained above, according to the embodiment of the present invention, it becomes possible to more accurately estimate the possibility of collision of the vehicle against an object with decreased degree of errors in the positional detection by calculating an approximation straight line used for approximating a relative movement track of the object with respect to the vehicle 10 based on a plural number (N) of data taken from the monitoring period$\Delta T$.

After the relative movement vector is obtained in step S16, an alarm determination process in which the possibility of collision against the detected object is determined is carried out (in step S17). The alarm determination process will be described later in detail.

In step S17, if it is determined that there is no possibility of collision of the vehicle 10 against the detected object (i.e., "NO" in step S17), the process returns to step S1 to repeat the above explained processes.

Also, if it is determined that there is a possibility of collision of the vehicle 10 with the detected object (i.e., "YES" in step S17), the process proceeds to an alarm output determination process in step S18.

In step S18, it is determined whether the alarm output determination process should be carried out, i.e., whether the alarm output should be performed, by determining whether the driver of the vehicle 10 is operating a brake based on the output BR from the brake sensor 5 (in step S18).

If the driver of the vehicle 10 is operating the brake, the acceleration Gs (deceleration direction thereof is regarded as positive) generated by the braking operation is calculated. If the acceleration Gs is greater than a predetermined threshold value GTH, it is determined that the collision will be avoided by the operation of the brake, and the alarm output determination process is terminated (i.e., "NO" in step S18). Then, the process returns to step S1 to repeat the above-explained processes.

In this manner, no alarm is generated when an appropriate brake operation is performed, and hence, it becomes possible to avoid bothering the driver.

Also, if the acceleration Gs is equal to or less than the predetermined threshold value, or if the driver of the vehicle 10 is not operating the brake (i.e., "YES" in step S18), the process immediately proceeds to step S19 and sounds an alarm for the driver by speaking, for instance, through the speaker 6, that the possibility of hitting an object is high. Moreover, the image obtained through the infrared camera 2a, for example, is output to the image display device 7 so that the approaching object may be displayed for the driver of the vehicle 10 as an enhanced image (in step S20).

Note that the predetermined threshold value GTH is a value which meets the conditions for stopping the vehicle 10 within the traveling distance shorter than the distance Zv(0) between the object and the vehicle 10 when the acceleration Gs during the braking operation is maintained as it is.

The operation for detecting the object and alarming the driver in the image processing unit 1 of the device for monitoring around a vehicle according to the embodiment of the present invention has been described. Next, the alarm determination process in step S17 of the flowchart shown in FIG. 3 will be described in detail with reference to a flowchart shown in FIG. 5

Figure 5:
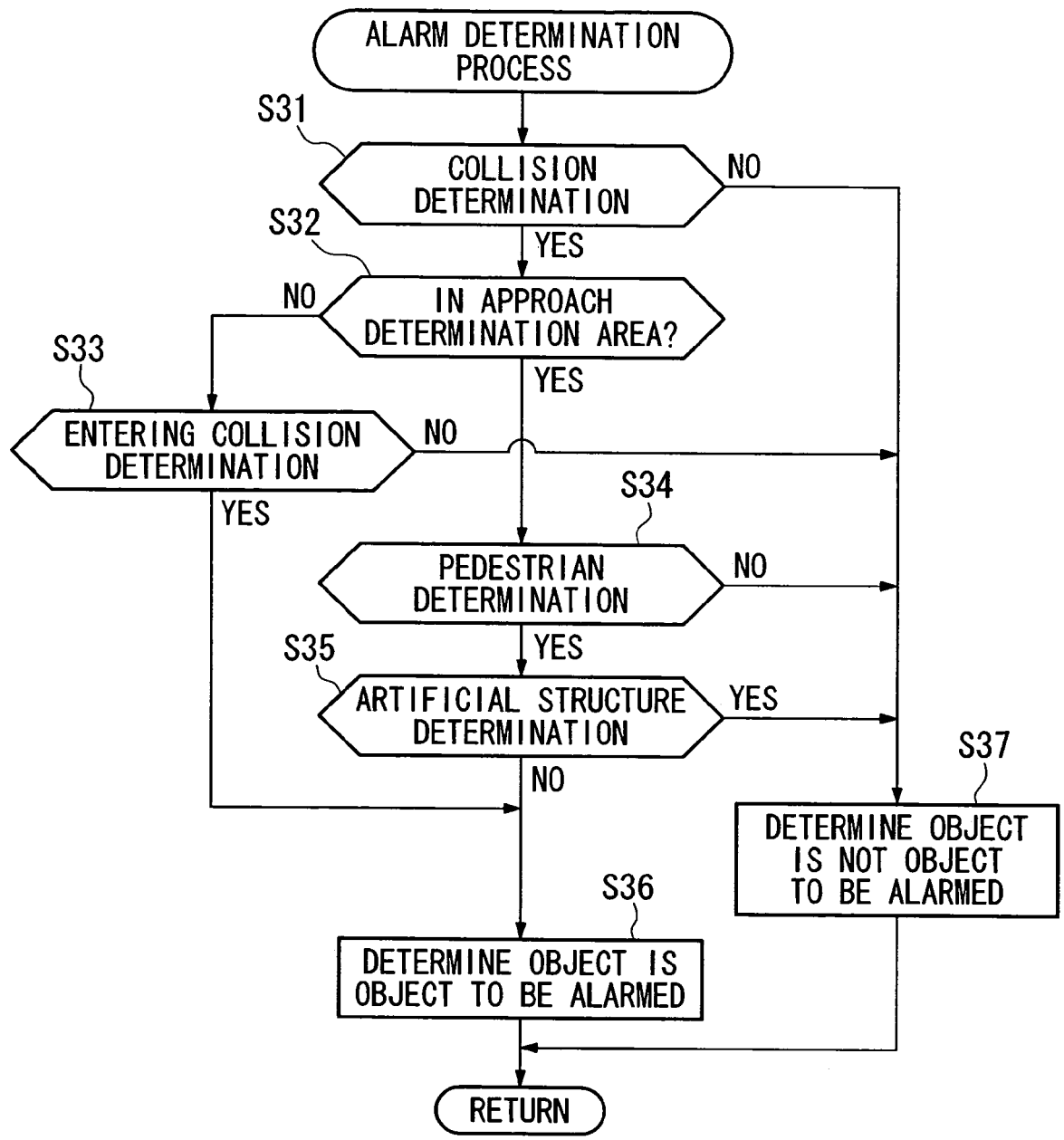
FIG. 5 is a flowchart for explaining an alarm determination process according to the embodiment of the present invention.

FIG. 5 is a flowchart showing the operation of the alarm determination process according to the embodiment of the present invention.

Figure 6:
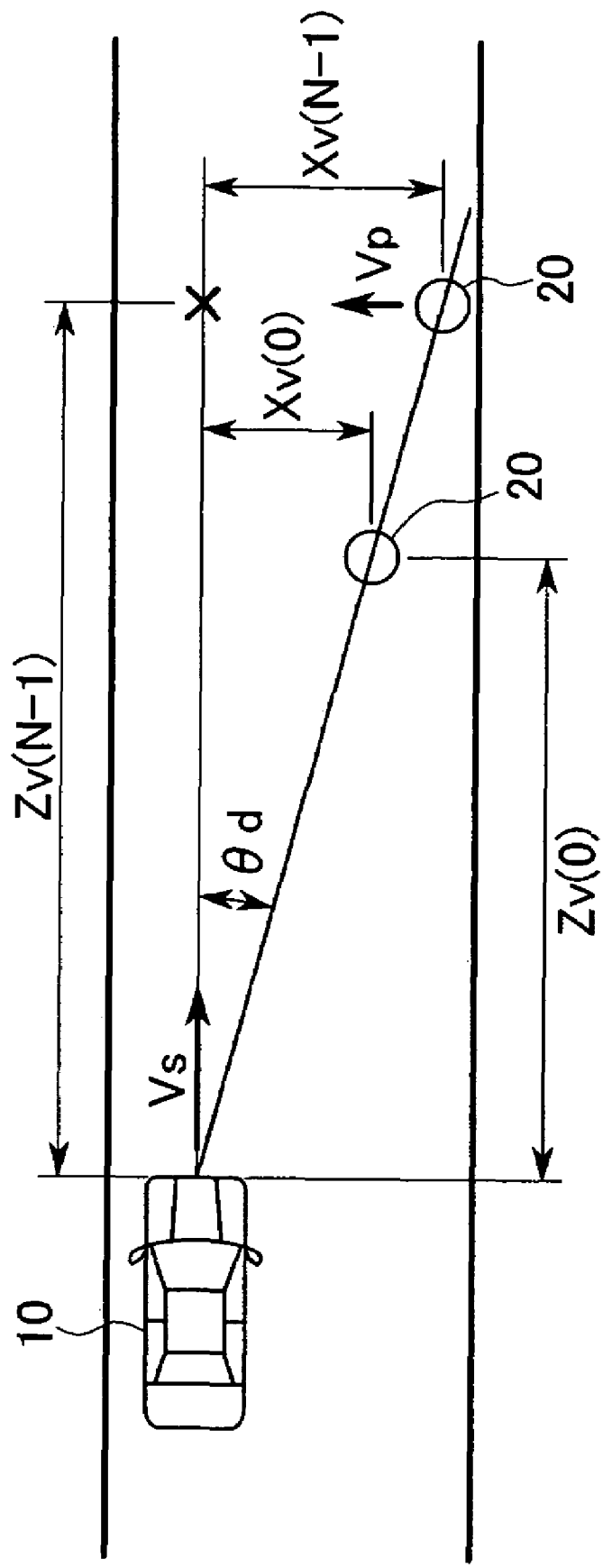
FIG. 6 is a diagram showing places where collision of a vehicle is likely to occur.

The alarm determination process is a process in which the possibility of collision of the vehicle 10 with a detected object is determined based on the following collision determination process, process for determining whether an object is within an approach determination area, entering collision determination process, pedestrian determination process, and artificial structure determination process. This will be explained using an example in which an object 20 proceeds at a speed Vp at an angle of almost 90° with respect to the traveling direction of the vehicle 10 as shown in FIG. 6.

In the flowchart shown in FIG. 5, the image processing unit 1 first carries out the collision determination process (in step S31). The collision determination process is a process in which, when the object 20 approaches the vehicle 10 from the distance Zv (N−1) to the distance Zn (0) within the time ΔT as shown in FIG. 6, the relative speed Vs with respect to the vehicle 10 in the Z direction is obtained, and it is determined whether the object will be hit by the vehicle 10 within a marginal time T assuming that the object 20 and the vehicle 10 keep moving while maintaining the relative speed Vs and the range of height H. Here, the marginal time T is provided so that the determination of the possibility of collision may be made before the estimated collision time with the margin of the time T. Accordingly, the marginal time T is set to be about 2 to 5 seconds, for example. Also, the height H is a predetermined height for defining the range in the height direction, and the height H may be set so as to be twice the height of the vehicle 10, for example.

Figure 7:
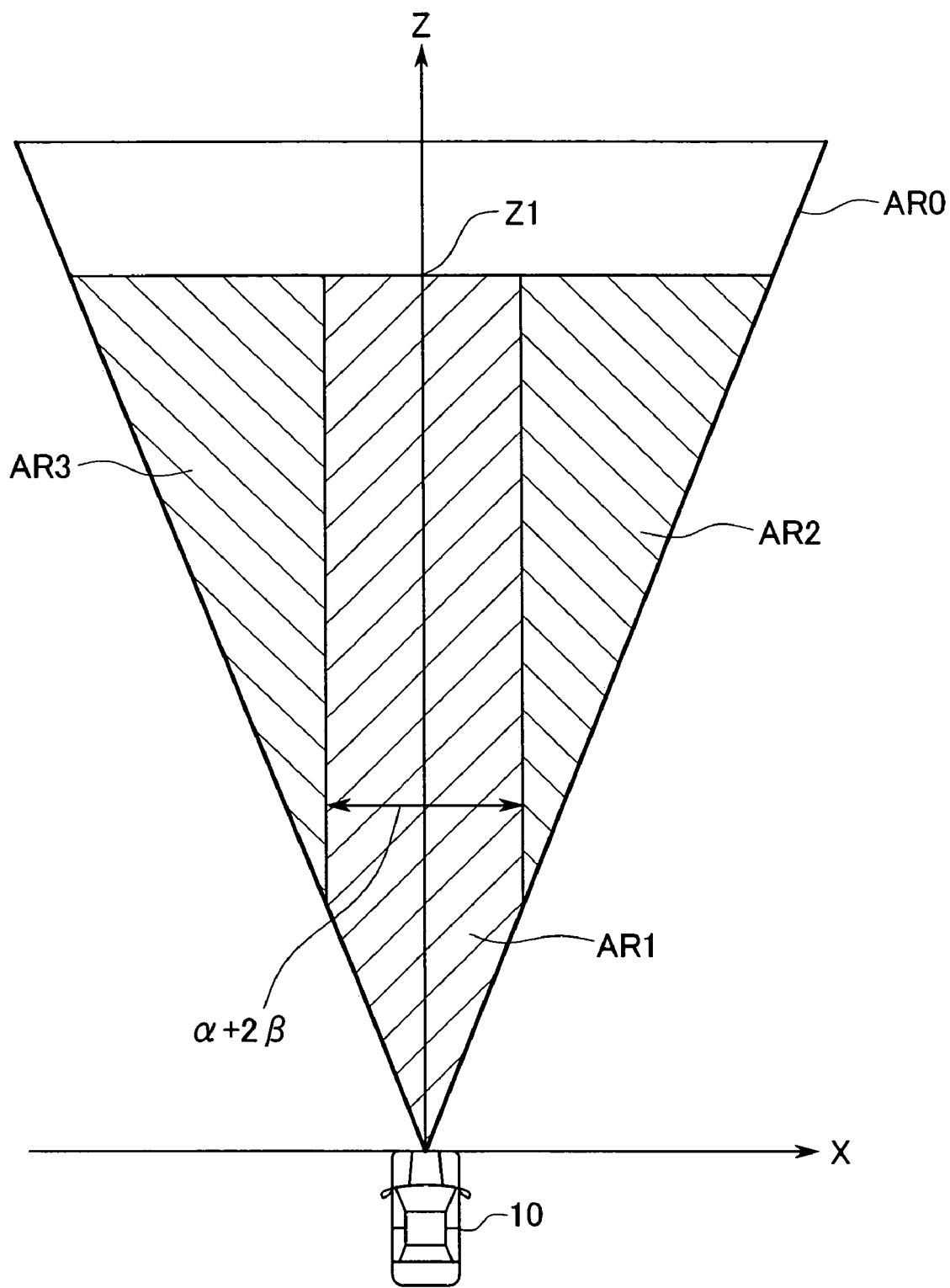
FIG. 7 is a diagram showing areas and sections in front of a vehicle according to the embodiment of the present invention.

Next, in step S31, if there is a possibility of collision between the vehicle 10 and the object within the marginal time T (i.e., "YES" in step S31), the image processing unit 1 carries out the process in which whether the object is in an approach determination area (in step S32) is determined in order to further improve the reliability in determination. The process for determining whether the object is in an approach determination area is a process in which it is determined whether the object is present in an approach determination area AR1 shown in FIG. 7 where the possibility of collision against the vehicle 10 is extremely high if the object remains there. As shown in FIG. 7, the approach determination area AR1, together with entering determination areas AR2 and AR3, is defined to be an area within a triangle area AR0 indicated by the solid line which shows an area that can be monitored using the infrared cameras 2R and 2L, and is nearer to the vehicle 10 with respect to the line indicating Z1=Vs×T. Among the areas AR1, AR2, and AR3, the approach determination area AR1 corresponds to an area having a width of α+2β where α is the width of the vehicle 10 and β is a margin (about 50 to 100 cm, for example) added to both sides of the width α of the vehicle 10 as shown in FIG. 7. Note that the approach determination area AR1 also has the predetermined height H.

In step S32, if it is determined that no object is present in the approach determination area AR1 (i.e., "NO" in step S32), the image processing unit 1 carries out the entering collision determination process in which it is determined whether there is a possibility that an object will enter the approach determination area AR1 and be hit by the vehicle 10 (in step S33). As shown in FIG. 7, in the entering determination areas AR2 and AR3, the absolute value of the X coordinate is larger than that of the above-mentioned approach determination area AR1, and the entering collision determination process is a process in which it is determined whether an object present in the area AR2 or AR3 may move and enter the approach determination area AR1 and may be hit by the vehicle 10. Note that each of the entering determination areas AR2 and AR3 also have the predetermined height H.

On the other hand, if an object is present in the approach determination area in step S32 (i.e., "YES" in step S32), the image processing unit 1 carries out the pedestrian determination process in which it is determined whether there is a possibility that the object is a pedestrian (in step S34). The pedestrian determination process will be described later in detail.

Also, if it is determined that there is a possibility that the object is a pedestrian in step S34 (i.e., "YES" in step S34), the artificial structure determination process in which it is determined whether the object is a pedestrian or not (in step S35) in order to increase the reliability in determination is carried out. The artificial structure determination process is a process in which the object is determined to be an artificial structure if the following characteristics, which cannot be present for a pedestrian, are detected in the image of the object, and the object is excluded from objects requiring an alarm to be sounded:

(1) when the image of the object contains a portion indicating an edge with a straight line;
(2) when a corner of the image of the object is a right angle corner;
(3) when the image of the object contains a plurality of portions of the same shape, and
(4) when the image of the object matches the shape of the artificial objects previously registered.

Accordingly, in the above-mentioned step S33, if there is a possibility that an object will enter the approach determination area and collide with the vehicle 10 (i.e., "YES" in step S33), and if the object which is determined to be a possible pedestrian is not an artificial structure in step S35 (i.e., "NO" in step S35), the image processing unit 1 determines that there is a possibility of collision between the vehicle 10 and the detected object (i.e., the object is regarded as an object requiring an alarm to be sounded) in step S36, and the process proceeds to step S18 (via "YES" in step S17) to perform the alarm output determination process (in step S18).

On the other hand, if it is determined that there is no possibility of collision between the vehicle 10 and the object within the marginal time T in the above-mentioned step S31 (i.e., "NO" in step S31), or if there is no possibility that the object will enter the approach determination area and collide with the vehicle 10 in step S33 (i.e., "NO" in step S33), or if it is determined in step S34 that there is no possibility that the object is a pedestrian (i.e., "NO" in step S34), or if the object determined to be a possible pedestrian in step S35 is an artificial structure (i.e., "YES" in step S35), the image processing unit 1 determines that there is no possibility of collision between the vehicle 10 and the object (i.e., the object is not an object requiring an alarm to be sounded) in step S37, and the process returns to step S1 via "NO" in step S17 shown in FIG. 3. In this manner, the operation for detecting and sounding alarms for objects, such as a pedestrian, is repeated.

Next, the pedestrian determination process in step 34 of the flowchart shown in FIG. 5 will be explained in detail with reference to flowcharts shown in FIGS. 8 through 13. FIGS. 8 through 13 are flowcharts showing the pedestrian determination process according to the embodiment of the present invention.

Figure 8:
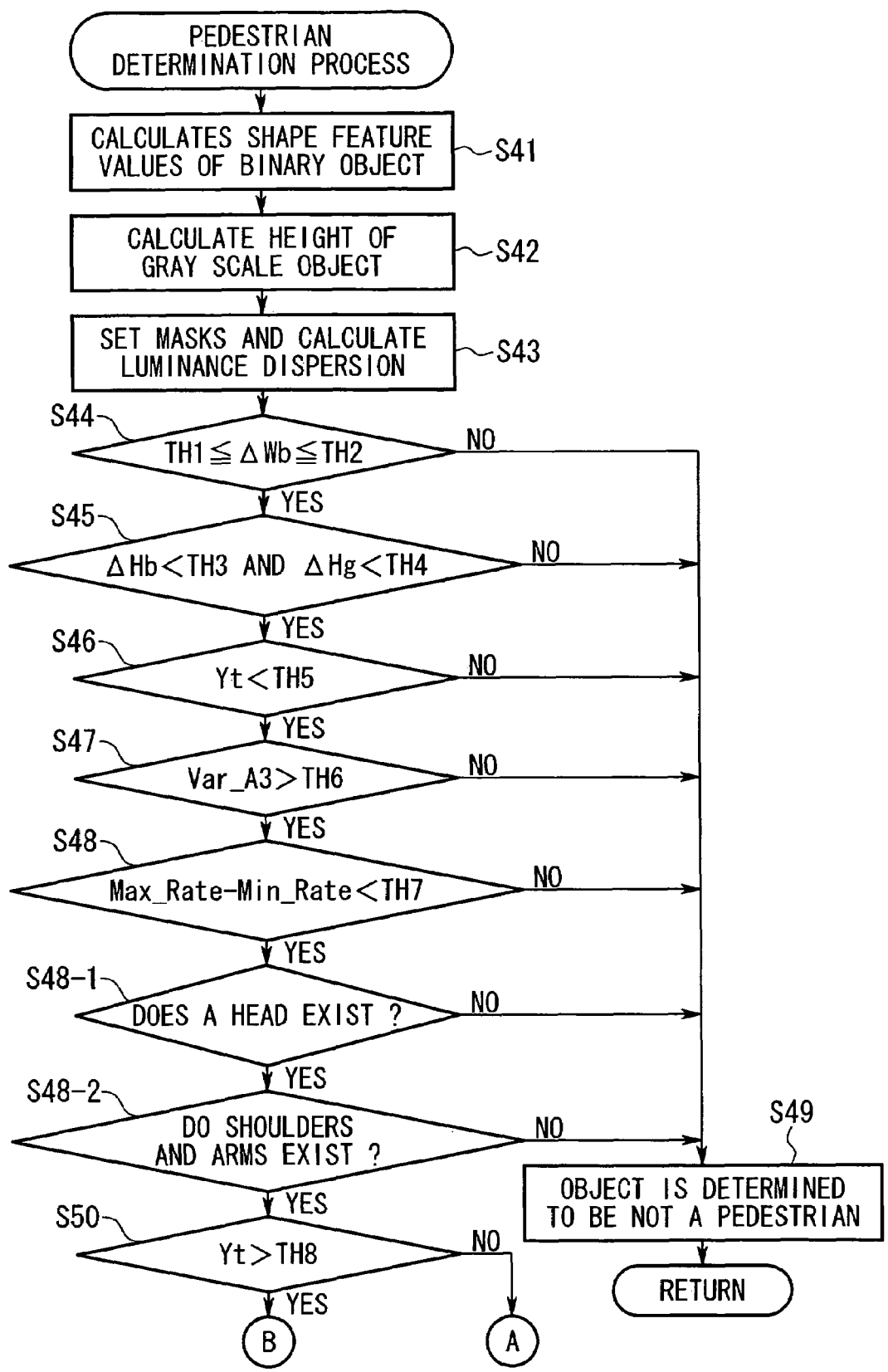
FIG. 8 is a flowchart for explaining a pedestrian determination process according to the embodiment of the present invention.
Figure 14:
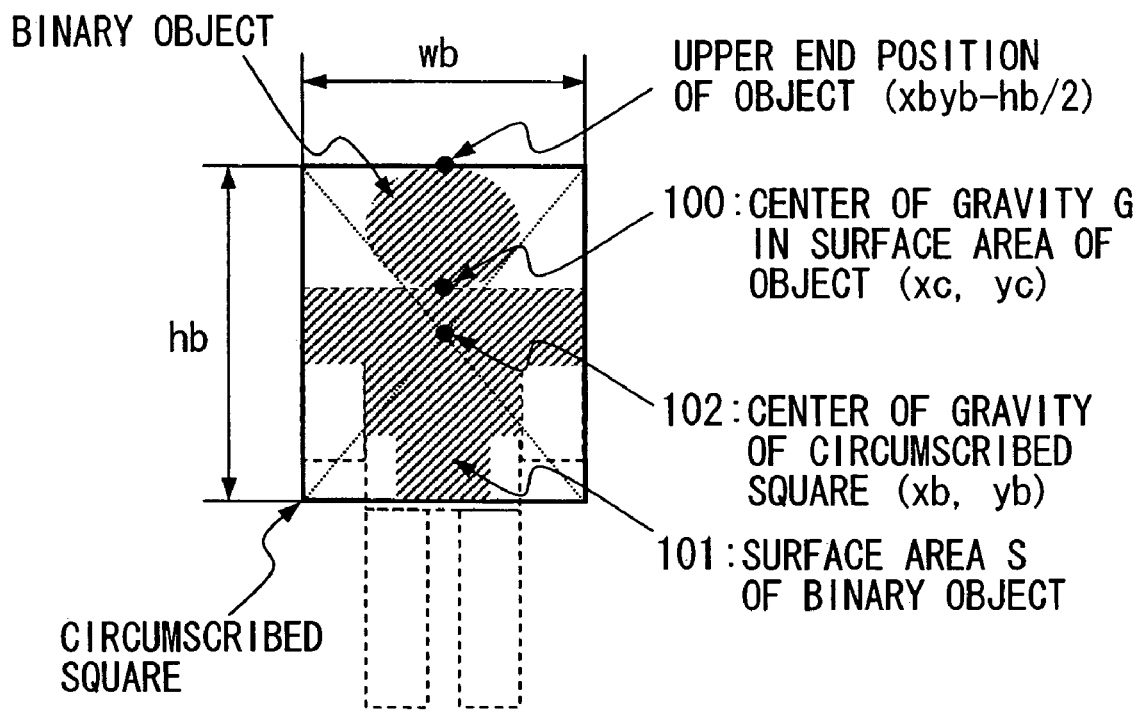
FIG. 14 is a diagram showing shape feature values of a binary object according to the embodiment of the present invention.

As shown in the flowchart shown in FIG. 8, the image processing unit 1 calculates shape feature values of a binary object (step S41), which show characteristics in shape of a binary object in real space, based on the center of gravity G (xc, yc) of the binary object calculated in step S8 in the flowchart shown in FIG. 3 (i.e., the center of gravity G100 of the binary object shown in FIG. 14), the surface area S (the surface S101 of the binary object shown in FIG. 14), the aspect ratio of the circumscribed square for the object, and the distance z between the vehicle 10 and the object calculated in step S13, in addition to the height hb and the width wb of the circumscribed square of the binary object shown in FIG. 14, and the barycentric coordinates (xb, yb) of the circumscribed square (i.e., the center of gravity 102 of the circumscribed square shown in FIG. 14). Note that the shape feature values of the binary object are calculated using the length D (m) of a baseline of the camera, the focal length f (m) of the camera, the pixel pitch p (m/pixel), and the parallax amount Δd (pixel) calculated using the correlation matching of the right and left images.

More specifically, since the rate between the circumscribed square and the surface area of the object may be expressed as:

$$Rate = S/(hb \times wb) \qquad (1)$$

the aspect (Asp) of the circumscribed square, which indicates the ratio of the length to the width of the circumscribed square, may be expressed as:

$$Asp = hb/wb \qquad (2)$$

and the distance z between the vehicle 10 and the object may be expressed as:

$$z = (f \times D)/(\Delta d \times p) \qquad (3),$$

the width ΔWb and the height ΔHb of the binary object in the real space may be calculated as:

$$\Delta Wb = wb \times z \times p/f$$

$$\Delta Hb = hb \times z \times p/f \qquad (4)$$

the barycentric coordinates (Xc, Yc, Zc) of the binary object may be calculated as:

$$Xc = xc \times z \times p/f$$

$$Yc = yc \times z \times p/f$$

$$Zc = z \qquad (5)$$

the barycentric coordinates (Xb, Yb, Zb) of the circumscribed square for the binary object may be calculated as:

$$Xb = xb \times z \times p/f$$

$$Yb = yb \times z \times p/f$$

$$Zb = z \qquad (6)$$

and the upper end positional coordinates (Xt, Yt, Zt) of the binary object may be calculated as:

$$Xt = xb \times z \times p/f$$

$$Yt = yb \times z \times p/f - \Delta Hb/2$$

$$Zt = z \qquad (7).$$

Then the height of the object in the gray scale image containing the binary object extracted in step S7 is obtained using the gray scale image obtained in step S3 in the flowchart shown in FIG. 3 (step S42). The height of the object in the gray scale image may be obtained by setting a plurality of mask areas of a predetermined size on the gray scale image from the upper end of the circumscribed square for the binary object, extracting an area containing the mask area as an area for the gray scale object in which the change in luminance in the mask area is large (i.e., the mask area contains the object and background image), the degree of correlation between the mask areas of the right hand side and left hand side image is high (i.e., objects of more than two are not present in the mask area), and the distance is the same as the binary object (i.e., the same parallax), and calculating the height (pixel) (expressed as "Height" in the following formula (8)) of the area for the gray scale object in the image to obtain the height ΔHg of the gray scale object using the formula (8):

$$\Delta Hg = z \times \text{Height} \times p/f \qquad (8)$$

Figure 15:
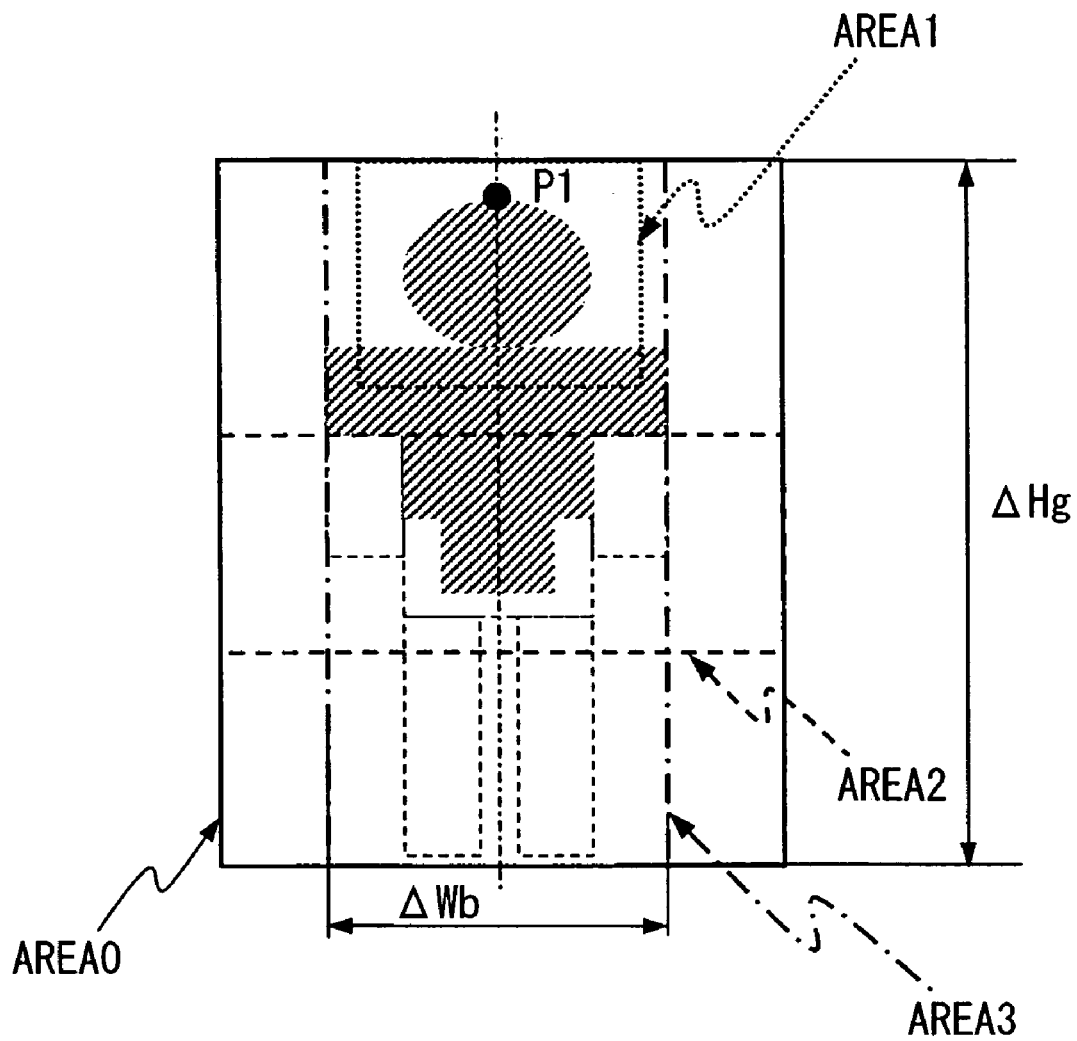
FIG. 15 is a diagram showing arrangement of mask areas according to the embodiment of the present invention.

Also, as shown in FIG. 15, the mask areas AREA1, AREA2, and AREA3 are set in the area of the gray scale object AREA0 in the image to calculate the mean luminance value and the change (dispersion) in luminance in each mask area (step S43). Here, the mean luminance value of the AREA1 is expressed as Ave_A1, and the dispersion in luminance of the AREA2 and AREA3 are expressed as Ave_A2 and Ave_A3, respectively. Note that in the following process, the AREA1 is used for the determination in the presence of a head portion of the object, the AREA2 is used for the determination in the presence of a body portion of the object, and the AREA3 is used for the determination in the presence of change in shape from the head portion to the lower half of the body portion. The AREA3 is also used, when a part of an object which is a heat-retaining object that does not generate heat by itself but retains heat which was externally applied, such as a wall, and shows a simple change in luminance is extracted by the binary process, for distinguishing the object from the pedestrian. Note that FIG. 15 is a diagram for schematically showing a pedestrian captured by a camera. In FIG. 15, the shaded area indicates a portion of the object captured by the binary process, and areas surrounded by dotted lines indicate portions of the object, the presence of which can be confirmed through the gray scale image with respect to the background thereof yet has not been revealed by the binary process. Also, the size of each portion shown in FIG. 15 is an example of the size of the portion in the real space.

Hereinafter, a pedestrian determination according to a shape of binary object and a luminance dispersion in each mask area in the gray scale image is explained more specifically according to flow charts shown in FIGS. 8 to 13.

First, an image processing unit 1 determines whether or not a height, width, an existence height, average luminance, and a luminance dispersion of the binary object are in an adequate range for a pedestrian.

More specifically, an object is a pedestrian; thus, the image processing unit 1 determines whether or not a width ΔWb as a binary object is in a range of threshold TH1 and TH2 (an adequate value for the width of pedestrian) (Step S44).

In step S44, if it is determined that the threshold value TH of the width ΔWb of the binary object is in the range of (TH1 ≦ ΔWb ≦ TH2) (i.e., "YES" in step S44), it is determined whether or not a height ΔHb of the binary object is less than a threshold TH3 (an adequate value for a height of a pedestrian) and whether or not a height ΔHg of the gray scale object is less than a threshold TH4 (an adequate value for a height of pedestrian) (step S45).

In step S45, if it is determined that the height ΔHb of the binary object is less than the threshold value TH3, and that the height ΔHg of the gray scale object is less than the threshold value TH4 (i.e., "YES" in step S45), it is determined whether the height position Yt of the upper end of the object from the surface of the road is less than the threshold value TH5 (i.e., in the range appropriate for the height of a pedestrian) in step S46.

Also, in step S46, if the height position Yt of the upper end of the object from the surface of the road is less than the threshold value TH5 (i.e., "YES" in step S46), it is determined whether or not the luminance dispersion Var_A3 of the mask area AREA3 is greater than the threshold value TH6 (in step S47). This process will be explained with reference to FIGS. 16A through 16C which show the luminance dispersion in the mask area AREA3 for the case where the object is a part or the a whole of a pedestrian, or a wall.

Figure 16A:
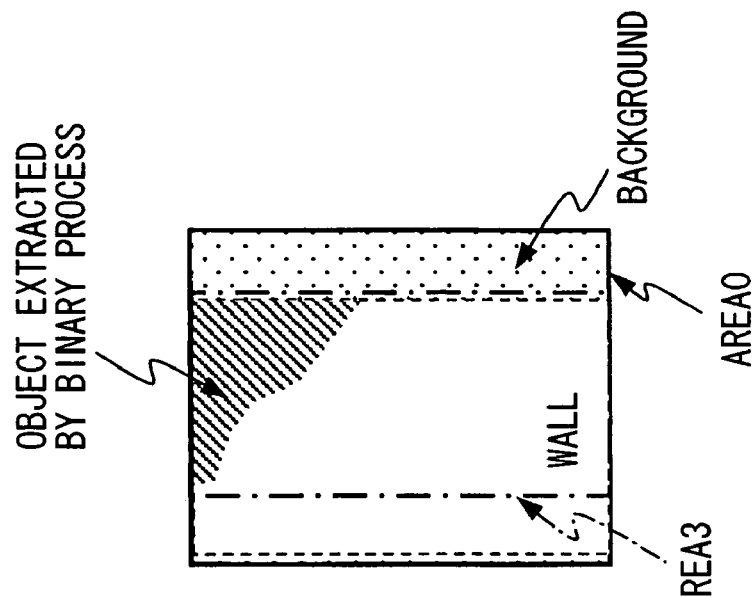
FIG. 16A to 16C are diagrams showing luminance distribution of a mask area AREA3 for the case where the object is a part of a pedestrian, a whole of a pedestrian, and a wall, respectively.
Figure 16B:
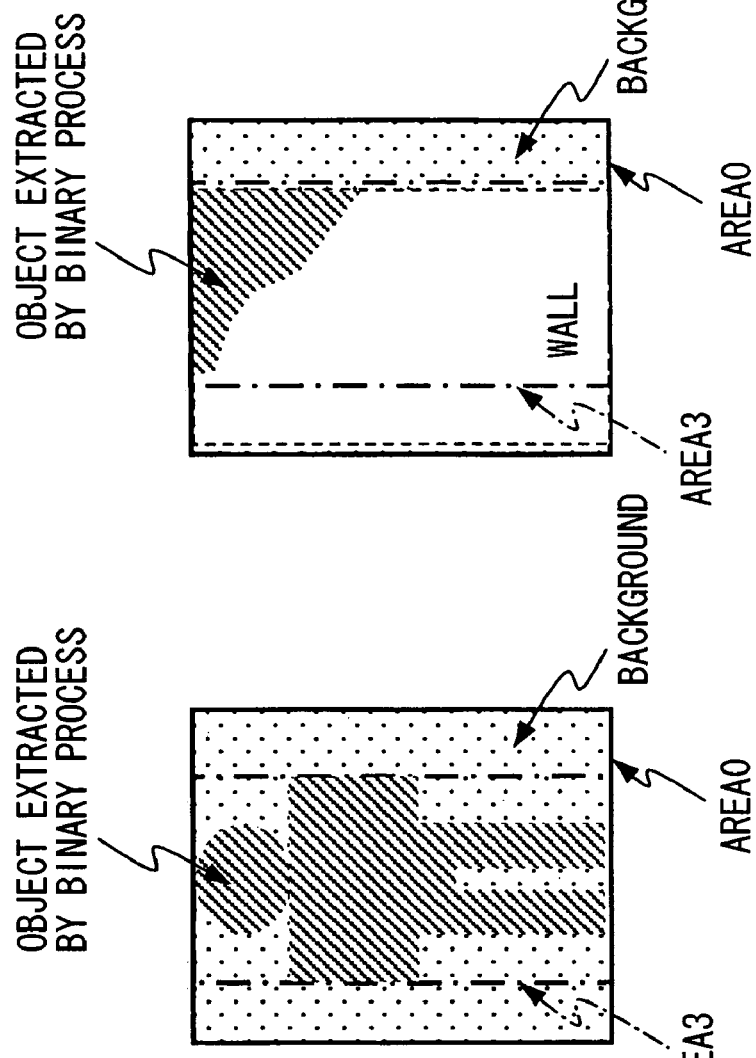
Figure 16C:
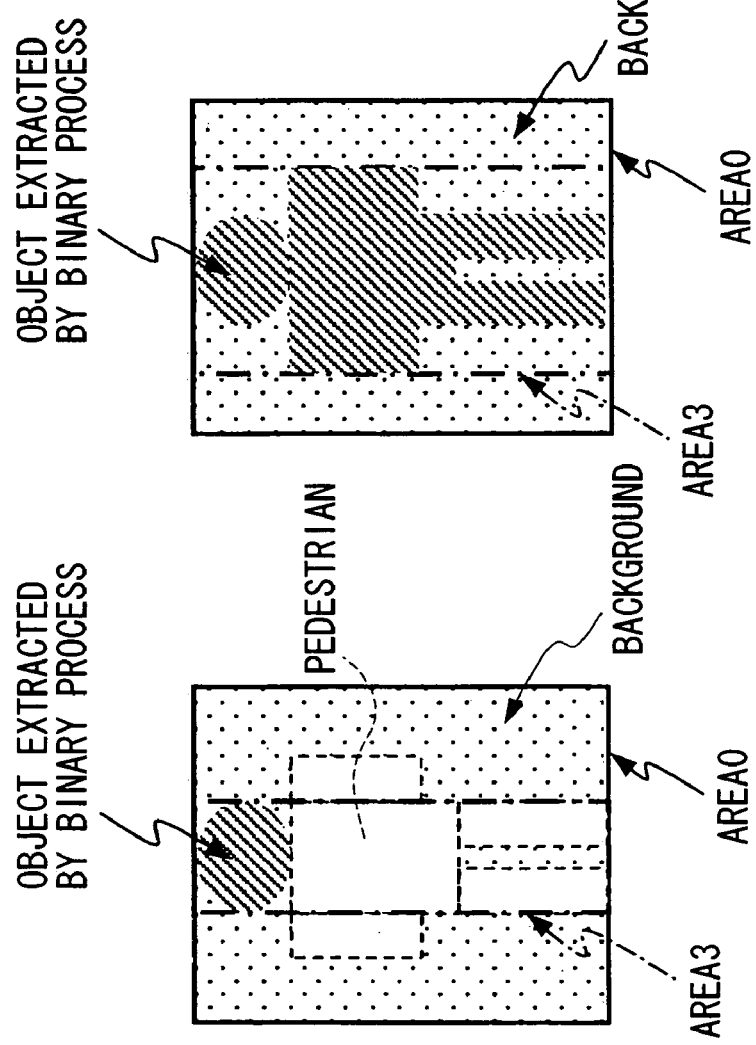

As shown in FIG. 16A, when only a head portion of a pedestrian is extracted by the binary process using the width of the mask area AREA3 as the width of the binary object, difference in the degree of luminance is caused between the head portion and the lower half of the body portion. Also, as shown in FIG. 16B, when the entire body or at least the upper half of the body of a pedestrian is extracted using the binary thresholding method, difference in the degree of luminance is generated between the body portion of the pedestrian and the background. On the other hand, as shown in FIG. 16C, for the object in which the difference in the temperature is small over all the parts of the objects, such as a wall, difference in the degree of luminance is also small between portions extracted by the binary process and portions not extracted by the binary process. Moreover, the object is formed by portions of straight lines as in the AREA3. For this reason, the luminance dispersion Var_A3 in the AREA3 is high for a pedestrian, and low for an object, such as a wall.

Accordingly, in step S47, it is determined if the object is a pedestrian by determining if the luminance dispersion Var_A3 of the mask area AREA3 is greater than the threshold value TH6.

Also, in step S47, if the luminance dispersion Var_A3 of the mask area AREA3 is greater than the threshold value TH6 (i.e., "YES" in step S47), the pedestrian determination process is carried out based on the change in shape of the object over time.

More specifically, since the object is a binary image of a pedestrian, it is considered that the shape of the binary image does not significantly change over time. For this reason, it is determined if the difference between the maximum value Max_Rate and the minimum value Min_Rate of the Rate, which indicates the ratio of the surface area between the circumscribed square and the binary image within a certain period of time, is less than the threshold value TH7 (in step S48).

Also, in step S48, if the difference between the maximum value Max_Rate and the minimum value Min_Rate of the Rate, which indicates the ratio of the surface area between the circumscribed square and the binary object within a certain period of time, is less than the threshold value TH7 (i.e., "YES" in step S48), in the next step, it is determined whether or not there exists an area which is supposed to correspond to a head of the pedestrian in an object which is captured in an area AREA0 (Step S48-1).

Furthermore, in the step S48-1, if there exists an area which is supposed to be the head of the pedestrian in an object which is captured in the AREA0 (i.e., "YES" in step S48-1), in the next step, it is determined whether or not there exists an area which is inferred to correspond to be the shoulders and arms of the pedestrian in the object which is captured in the area AREA0 (Step S48-2).

Here, details are explained later for a method (Step S48-1 and Step S48-2) for determining whether or not an area which is inferred to correspond to at least a head, shoulders, and arms of the pedestrian in the object which is captured in the area AREA0.

On the other hand, in either one of following cases in which a width ΔWb of the binary object is less than the threshold value TH1 or greater than the threshold TH2 in the step S44 (i.e., "NO" in the step S44), or the height ΔHb of the binary object is equal to or greater than the threshold TH3 in the step S45, or further if a height ΔHg of the gray scale object is equal to or greater than the threshold TH4 (i.e., "NO" in the step S45), the height position Yt of the upper end of the object from the surface of the road is equal to or greater than the threshold value TH5 in the step S46 (i.e., "NO" in the step S46), or a luminance dispersion in a mask area AREA3 is equal to or less than the threshold value TH6 in the step S47 (i.e., "NO" in the step S47), a process for determining a pedestrian is completed by determining that the object which is captured in the area AREA0 is not a pedestrian (Step S49); thus, the process proceeds to a step S37 shown in FIG. 5 because it is determined as "NO" in the step S34 shown in FIG. 5 such that no alarm should be issued to the object.

Similarly, in either one of following cases in which the difference between the maximum value Max_Rate and the minimum value Min_Rate of the Rate, which indicates the ratio of the surface area between the circumscribed square and the binary image within a certain period of time, is equal to or greater than the threshold value TH7 in the step S48 (i.e., "NO" in the step S48), or there does not exist an area which is inferred to correspond to a head of the pedestrian in an object which is captured in the area AREA0 in the step S48-1 (i.e., "NO" in the step S48-1), or there does not exist an area which is inferred to correspond to the shoulders and arms of the pedestrian in the object which is captured in the area AREA0 in the step S48-2 (i.e., "NO" in the step S48-2), a process for determining a pedestrian is completed by determining that the object which is captured in the area AREA0 is not a pedestrian (Step S49); thus, the process proceeds to a step S37 shown in FIG. 5 because it is determined as "NO" in the step S34 shown in FIG. 5 such that no alarm should be issued to the object.

Also, if an area which is inferred to correspond to the shoulders and the arms of the pedestrian exists in the object which is captured in the area AREA0 in the step S48-2 (i.e., "YES" in the step S48-2), in the next step, the image processing unit 1 then carries out the pedestrian determination process for the shape of each extracted object in further detail.

More specifically, it is determined whether the height position Yt of the upper end of the object from the surface of the road is greater than the threshold value TH8 (which is a value appropriate for the height distinguishing the upper half from the lower half of the body of a pedestrian) (in step S50).

Figure 9:
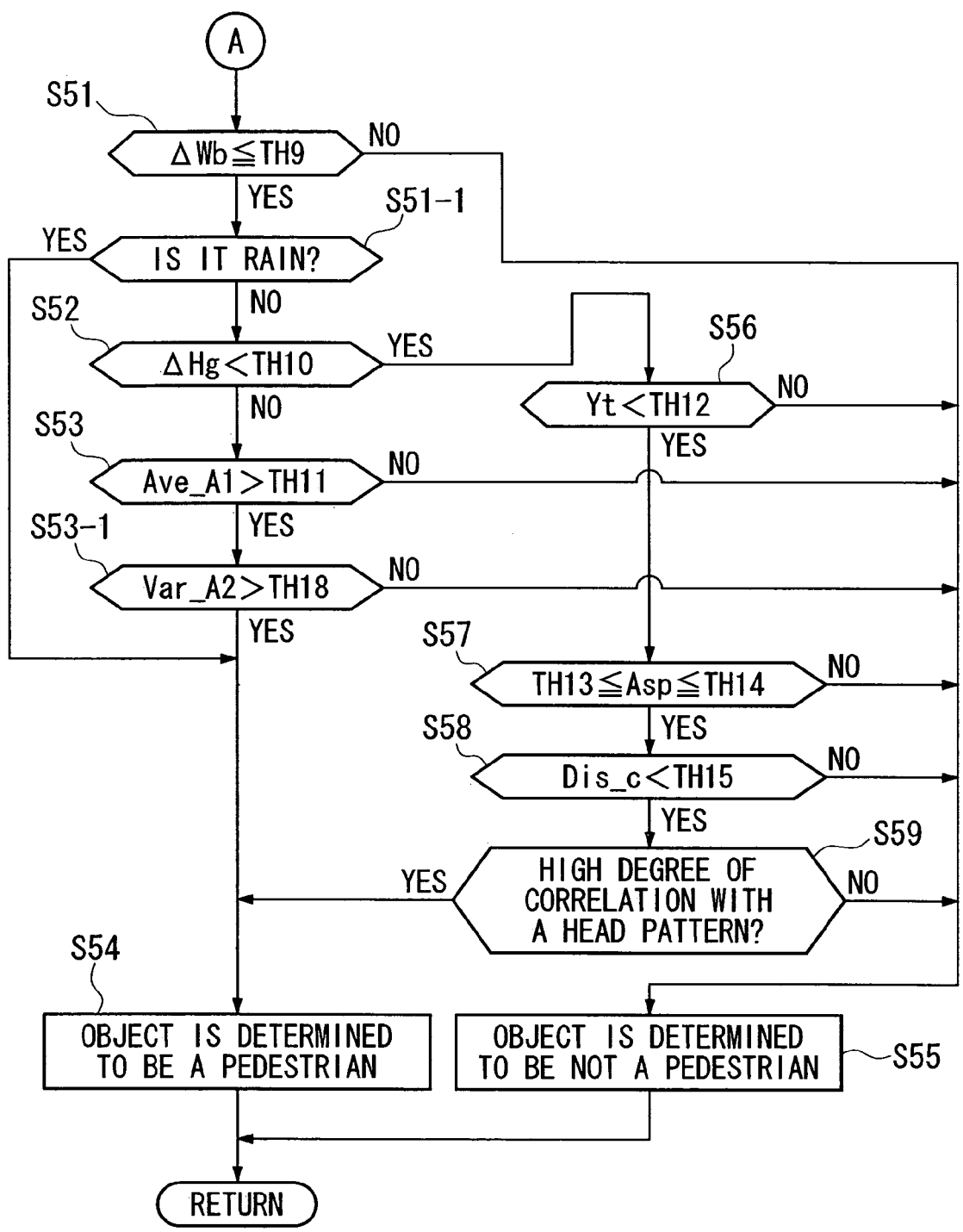
FIG. 9 is a flowchart for explaining a pedestrian determination process according to the embodiment of the present invention.

In step S50, if the height position Yt of the upper end of the object from the surface of the road is equal to or less than the threshold value TH8 (i.e., "NO" in step S50), the process proceeds to step S51 shown in the flowchart in FIG. 9. In step S51, it is determined if the width ΔWb of the binary object is equal to or less than the threshold value TH9, which is a value appropriate for the width of the body of a pedestrian) to determine if it is a lower half of the body of a pedestrian or a sitting pedestrian.

FIG. 9 is a flowchart showing the procedure for distinguishing a pedestrian whose lower half of the body is extracted by the binary process or who is sitting. In step S51 of the flowchart, if the width ΔWb of the binary object is equal to or less than the threshold value TH9 (i.e., "YES" in step S51), it is determined whether or not the height ΔHg of the gray scale object is less than the threshold value TH10, which is a value appropriate for the height of a pedestrian, in order to determine if the object is a sitting pedestrian (in step S52). Optionally, after step S51, it may be determined whether it is raining around the vehicle. If it is raining, the process proceeds to step S54, while if it is not raining, the process proceeds to step S52.

In step S52, if the height ΔHg of the gray scale object is equal to or greater than the threshold value TH10 (i.e., "NO" in step S52), it is assumed that the object corresponds to the body or the lower half of the body of a pedestrian. Then, in order to determine if a head portion is present above the object, it is determined if the mean luminance value Ave_A1 of the mask area AREA1 shown in FIG. 15 is greater than the threshold value TH11 (in step S53).

In step S53, if it is determined that the mean luminance value Ave_A1 of the mask area AREA1 is larger than the threshold value TH11 (i.e., "YES" in step S53), it is determined if the luminance dispersion Var_A2 of the mask area AREA2 is greater than the threshold value TH18 assuming that the AREA2 has a luminance pattern in the gray scale image since the body portion contains portions from which heat is not easily emitted due to the effects of wearing clothing (in step S53-1).

In step S53-1, if the luminance dispersion Var_A2 of the mask AREA2 is larger than the threshold value TH18 (i.e., "YES" in step S53-1), it is determined that the detected object (or the object captured in the area AREA0) is a pedestrian (in step S54), and the pedestrian determination process is terminated. Then the process proceeds to step S35 in FIG. 5 (via "YES" in step S34) to carry out the artificial structure determination process.

On the other hand, if it is determined that the width ΔWb of the binary object is greater than the threshold value TH9 (i.e., "NO" in step S51), or in step S53, if the mean luminance value Ave_A1 of the mask area AREA1 is equal to or less than the threshold value 11 (i.e., "NO" in step S53), or in step S53-1, if the luminance dispersion Var_A2 of the mask AREA2 is equal to or less than the threshold value TH18 (i.e., "NO" in step S53-1), it is determined that the detected object (or the object captured in the area AREA0) is not a pedestrian (in step S55), and the pedestrian determination process is terminated. Then, the process proceeds to step S37 in FIG. 5 (via "NO" in step S34) to determine that the object is not an object requiring an alarm to be raised.

Also, in step S52, if it is determined that the height ΔHg of the gray scale object is less than the threshold value TH10 (i.e., "YES" in step S52), the object is assumed to be a sitting pedestrian, and it is determined whether the height position Yt of the upper end of the binary object from the surface of the road is greater than the threshold value TH12, (i.e., a value appropriate for the height distinguishing a sitting pedestrian from a standing pedestrian) in step S56).

In step S56, if the height position Yt of the upper end of the binary object from the surface of the road is greater than the threshold value TH12 (i.e., "YES" in step S56), it is determined if the Asp, which expresses the aspect ratio (i.e., the ratio of length to width) of a circumscribed square for the binary object, is equal to or greater than the threshold value TH13 and equal to or less than the threshold value TH14 (i.e. a value appropriate for a pedestrian) in step S57.

In step S57, if the value of Asp, which expresses the aspect ratio of a circumscribed square for the binary object, is equal to and greater than the threshold value TH13 and equal to or less than the threshold value TH14 (i.e., "YES" in step S57), it is determined if the distance Dis_c between the center of gravity in the circumscribed square 102 and the center of gravity G100 in the binary object in the real space, which may be expressed as the following equation (9), is less than the threshold value TH15, i.e., a value appropriate for a pedestrian (in step S58).

$$Dis\_c = SQRT((Xb-Xc)^2 + (Yb-Yc)^2) \qquad (9)$$

In step S58, if the distance Dis_c is less than the threshold value TH15 (i.e., "YES" in step S58), it is determined if a portion having high correlation with predetermined patterns of a head portion is present in the mask area AREA1 of the binary object since objects other than a pedestrian, such as a front portion of a vehicle, may be contained in objects having the ΔWb of 1.0 m or less and the ΔHg of less than 1.0 m, for example (in step S59).

In step S59, if a portion having high degree of correlation with pre-registered patterns of a head portion is present in the mask area AREA1 of the binary object (i.e., "YES" in step S59), it is determined that the detected object (or the object captured in the area AREA0) is a pedestrian (in step S54), and the pedestrian determination process is terminated. Then, the process proceeds to step S35 in FIG. 5 (via "YES" in step S34) to carry out the artificial structure determination process.

In step S56, on the other hand, if it is determined that the height position Yt of the upper end of the binary object from the surface of the road is equal to or less than the threshold value TH12 (i.e., "NO" in step S56), or in step S57, if the value of Asp, which expresses the aspect ratio of a circumscribed square for the binary object, is less than the threshold value TH13 or greater than the threshold value TH14 (i.e., "NO" in step S57), or in step S58, if the distance Dis_c is equal to or greater than the threshold value TH15 (i.e., "NO" in step S58), or in step S59, if a portion having high degree of correlation with pre-registered patterns of a head portion is not present in the mask area AREA1 of the binary object (i.e., "NO" in step S59), it is determined that the detected object (or the object captured in the area AREA0) is not a pedestrian (in step S55), and the pedestrian determination process is terminated. Then, the process proceeds to step S37 in FIG. 5 (via "NO" in step S34), and it is determined that the object is not an object requiring an alarm to be sounded.

Figure 10:
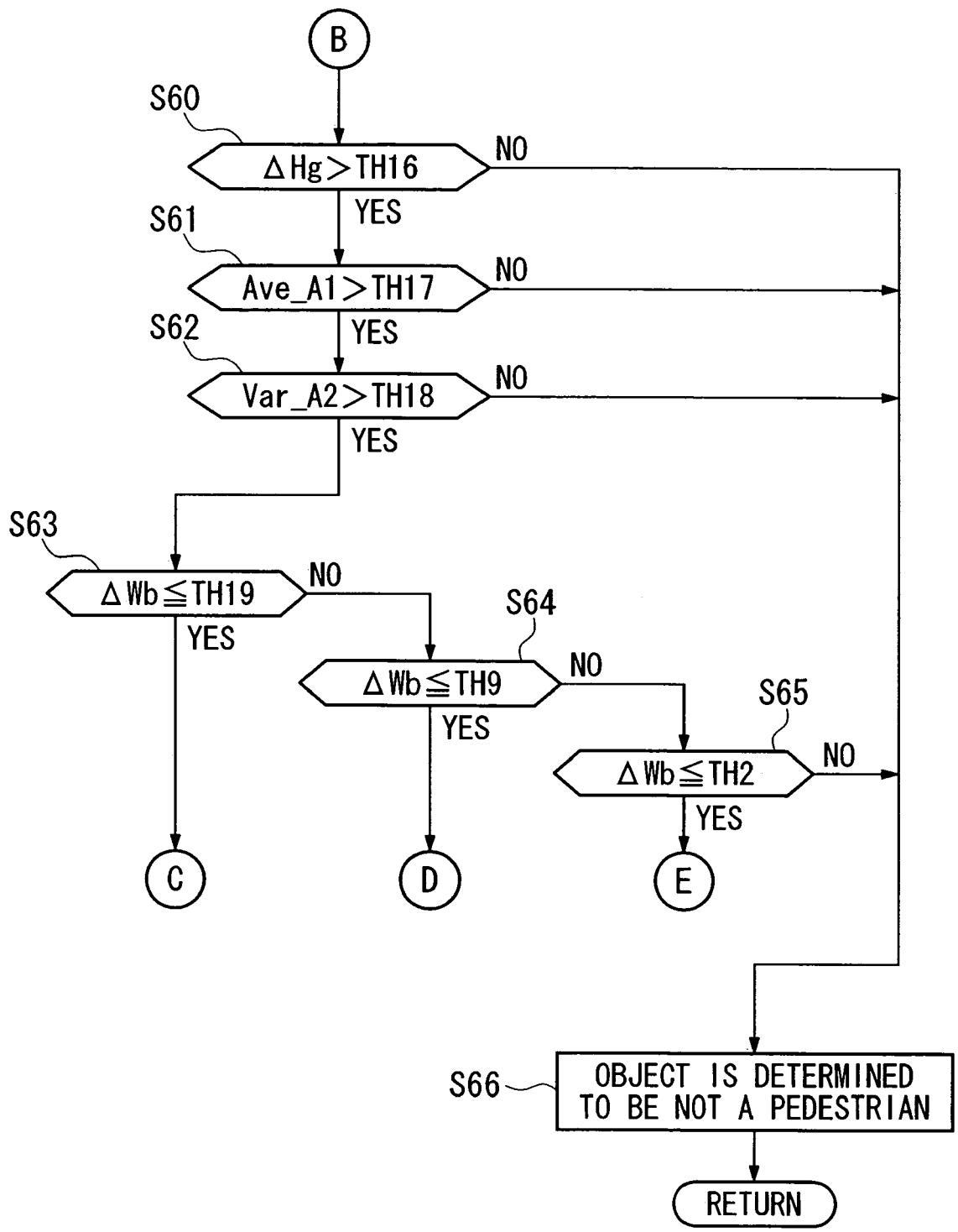
FIG. 10 is a flowchart for explaining a pedestrian determination process according to the embodiment of the present invention.

Also, in step S50 in FIG. 8, if it is determined that the height position Yt of the upper end of the object from the surface of the road is greater than the threshold value TH8, i.e., a value appropriate for the height distinguishing the upper half from the lower half of the body of a pedestrian (i.e., "YES" in step S50), the process proceeds to step S60 shown in FIG. 10, and it is determined whether or not the height ΔHg of the gray scale object is greater than the threshold value TH16, which is the same value as the above-mentioned threshold value TH8, in order to determine whether or not the object is an article present in the air (for instance, a curved mirror) in step S60.

FIG. 10 is a flowchart showing a procedure for distinguishing a pedestrian whose head portion or an upper half of the body has been extracted by the binary thresholding method. If the height ΔHg of the gray scale object is greater than the threshold value TH16 in step 60 (i.e., "YES" in step S60), it is determined that the object is not an article present in the air. Then, it is determined if a head portion is present at the upper portion in the object area (i.e., the AREA0), or if a body portion is present. More specifically, it is determined if the mean luminance value Ave_A1 of the mask area AREA1 is greater than the threshold value TH17 since the head portion is exposed to the outside (in step S61).

In step S61, if it is determined that the mean luminance value Ave_A1 of the mask area AREA1 is greater than the threshold value TH17 (i.e., "YES" in step S61), it is determined whether the luminance dispersion Var_A2 of the mask area AREA2 is greater than the threshold value TH18 regarding that the AREA2 has a luminance pattern in the gray scale image since the body portion contains portions from which heat is not easily emitted due to the effects of wearing clothing (in step S62).

Also, in step S62, if it is determined that the luminance dispersion Var_A2 of the mask area AREA2 is greater than the threshold value TH18 (i.e., "YES" in step S62), it is determined whether the width ΔWb of the binary object is equal to or less than the threshold value TH19, which is a value appropriate for the width for distinguishing a head portion or an upper half of the body of a pedestrian, to determine if it is a pedestrian whose head portion or the upper half of the body has been extracted using the binary process (in step S63).

Then, if it is determined that the width ΔWb of the binary object is greater than the threshold value TH19 in step S63 (i.e., "NO" in step S63), it is determined whether the width ΔWb of the binary object is equal to or less than the threshold value TH9, which is a value appropriate for the width of a body of a pedestrian, in order to determine if it is a pedestrian whose whole body or at least the upper half of the body has been extracted by the binary process (in step S64).

Moreover, in step S64, if the width ΔWb of the binary object is larger than the threshold value TH9 (i.e., "NO" in step S64), it is determined whether the width ΔWb of the binary object is equal to or less than the threshold value TH2, which is a value appropriate for the width of a body of a pedestrian, in order to determine if a plurality of pedestrians are walking in parallel (in step S65).

Furthermore, in the above-mentioned determination processes, if the height ΔHg of the gray scale is equal to or less than the threshold value TH16 in step S60 (i.e., "NO" in step S60), or if it is determined that the mean luminance value Ave_A1 of the mask area AREA1 is equal to or less than the threshold value TH17 in step S61 (i.e., "NO" in step S61), or if it is determined that the luminance dispersion Var_A2 of the mask area AREA2 is equal to or less than the threshold value TH18 in step S62 (i.e., "NO" in step S62), or if it is determined that the width ΔWb of the binary object is greater than the threshold value TH2 in step S65 (i.e., "NO" in step S65), it is determined that the detected object (or the object captured in the area AREA0) is not a pedestrian (in step S66), and the pedestrian determination process is terminated. The process then proceeds to step S37 shown in FIG. 5 (via "NO" in step S34), and it is determined that the object is not an object requiring an alarm to be sounded.

On the other hand, if it is determined that the width ΔWb of the binary object is equal to or less than the threshold value TH19 in step S63 (i.e., "YES" in step S63), it is determined that the object is a pedestrian whose head portion or the upper half of the body has been extracted by the binary process, and the process proceeds to step S67 in the flowchart shown in FIG. 1. In step S67, it is determined whether the value of Asp, which expresses the aspect ratio of the circumscribed square for the binary object, is equal to or greater than the threshold value TH20 and is equal to or less than the threshold value TH21, i.e., a value appropriate for a head portion or the upper half portion of a pedestrian.

Figure 11:
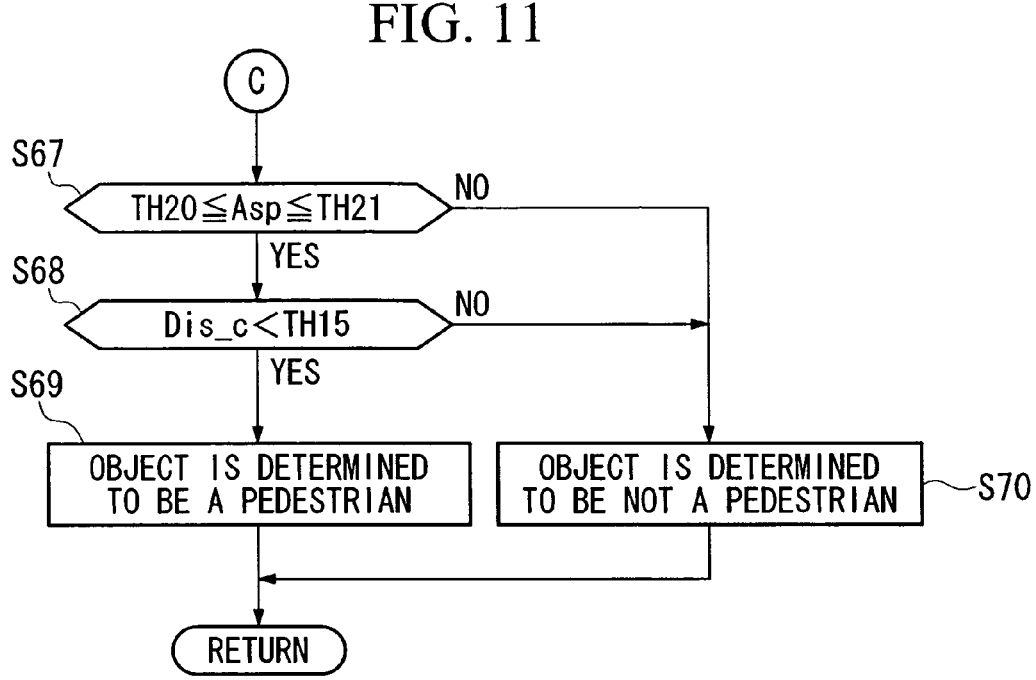
FIG. 11 is a flowchart for explaining a pedestrian determination process according to the embodiment of the present invention.

FIG. 11 is a flowchart showing a procedure for distinguishing a pedestrian whose head portion or the upper half of the body has been extracted using the binary process. In step S67, if the value of Asp, which expresses the aspect ratio of the circumscribed square for the binary object, is equal to or greater than the threshold value TH20 and is equal to or less than the threshold value TH21 (i.e., "YES" in step S67), it is determined if the distance Dis_c between the center of gravity in the above-mentioned circumscribed square 102 and the center of gravity G100 in the binary object in the real space is less than the threshold value TH15 (in step S68).

In step S68, if it is determined that the distance Dis_c is less than the threshold value TH15 (i.e., "YES" in step S68), it is regarded that the detected object (or the object captured in the area AREA0) is a pedestrian (in step S69), and the pedestrian determination process is terminated. Then, the process proceeds to step S35 shown in FIG. 5 (via "YES" in step S34) to carry out the artificial structure determination process.

On the other hand, if the value of Asp, which expresses the aspect ratio of the circumscribed square for the binary object, is less than the threshold value TH20 or is greater than the threshold value TH21 (i.e., "NO" in step S67), or in step S68, if it is determined that the distance Dis_c is equal to or greater than the threshold value TH15 (i.e., "NO" in step S68), it is regarded that the detected object (or the object captured in the area AREA0) is not a pedestrian (in step S70), and the pedestrian determination process is terminated. Then, the process proceeds to step S37 shown in FIG. 5 (via "NO" in step S34), and it is determined that the object is not an object requiring an alarm to be sounded.

Figure 12:
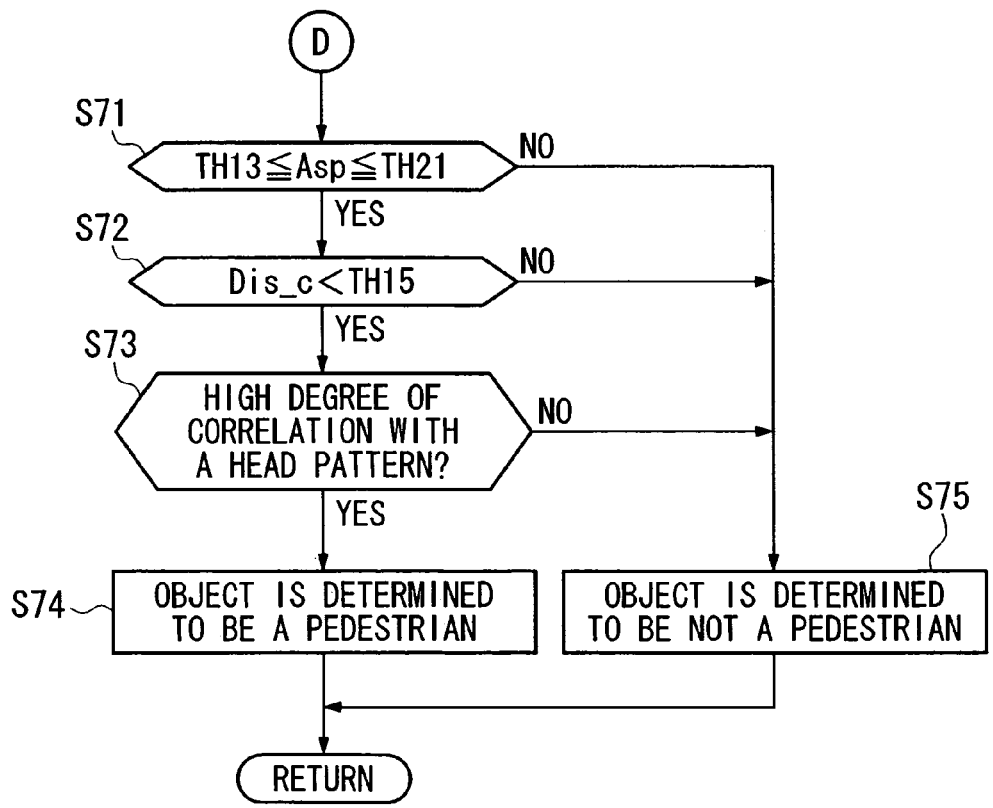
FIG. 12 is a flowchart for explaining a pedestrian determination process according to the embodiment of the present invention.

Also, in step S64 in FIG. 10, if the width ΔWb of the binary object is equal to or less than the threshold value TH9 in step S64 (i.e., "YES" in step S64), it is determined that the object is a pedestrian whose head portion or the upper half of the body has been extracted by the binary process, and the process proceeds to step S71 in the flowchart shown in FIG. 12. In step S71, it is determined whether the value of Asp, which expresses the aspect ratio of the circumscribed square for the binary object, is equal to or greater than the threshold value TH13 and is equal to or less than the threshold value TH21, i.e., if the value is appropriate for the entire or the upper half of the body of a pedestrian.

FIG. 12 is a flowchart showing a procedure for distinguishing a pedestrian whose head portion or the upper half of the body has been extracted using the binary process. In step S71, if the value of Asp, which expresses the aspect ratio of the circumscribed square for the binary object, is equal to or greater than the threshold value TH13 and is equal to or less than the threshold value TH21 (i.e., "YES" in step S71), it is determined if the distance Dis_c between the center of gravity in the above-mentioned circumscribed square 102 and the center of gravity G100 in the binary object in the real space is less than the threshold value TH15 (in step S72).

In step S72, if it is determined that the distance Dis_c is less than the threshold value TH15 (i.e., "YES" in step S72), it is determined whether or not a portion having high correlation with pre-registered patterns of a head portion is present in the mask area AREA1 of the binary object since objects other than a pedestrian, such as a front portion of a vehicle, may be contained among the objects (in step S73).

In step S73, if a portion having a high degree of correlation with pre-registered patterns of a head portion is present in the mask area AREA1 of the binary object (i.e., "YES" in step S73), it is regarded that the detected object (or the object captured in the area AREA0) is a pedestrian (in step S74), and the pedestrian determination process is terminated. Then, the process proceeds to step S35 in FIG. 5 (via "YES" in step S34) to carry out the artificial structure determination process.

On the other hand, if it is determined that the value of Asp, which expresses the aspect ratio of the circumscribed square for the binary object, is less than the threshold value TH13 or is greater than the threshold value TH21 (i.e., "NO" in step S71), or in step S72, if it is determined that the distance Dis_c is equal to or greater than the threshold value TH15 (i.e., "NO" in step S72), or in step S73, if a portion having high degree of correlation with pre-registered patterns of a head portion is not present in the mask area AREA1 of the binary object (i.e., "NO" in step S73), it is determined that the detected object (or the object captured in the area AREA0) is not a pedestrian (in step S74), and the pedestrian determination process is terminated. Then, the process proceeds to step S37 in FIG. 5 (via "NO" in step S34) to determine that the object is not an object requiring an alarm to be sounded.

Also, in step S65 of the flowchart shown in FIG. 10, if it is determined that the width ΔWb of the binary object is equal to or less than the threshold value TH2 (i.e., "YES" in step S65), it is considered that a large background area is contained in the circumscribed square for the object since the object includes a plurality of pedestrians walking in parallel. The process proceeds to step S76 in FIG. 13 to determine if the value of RATE, which is the ratio of the surface area of the circumscribed square to that of the binary image within a certain period of time, is less than the threshold value TH22 (in step S76).

Figure 13:
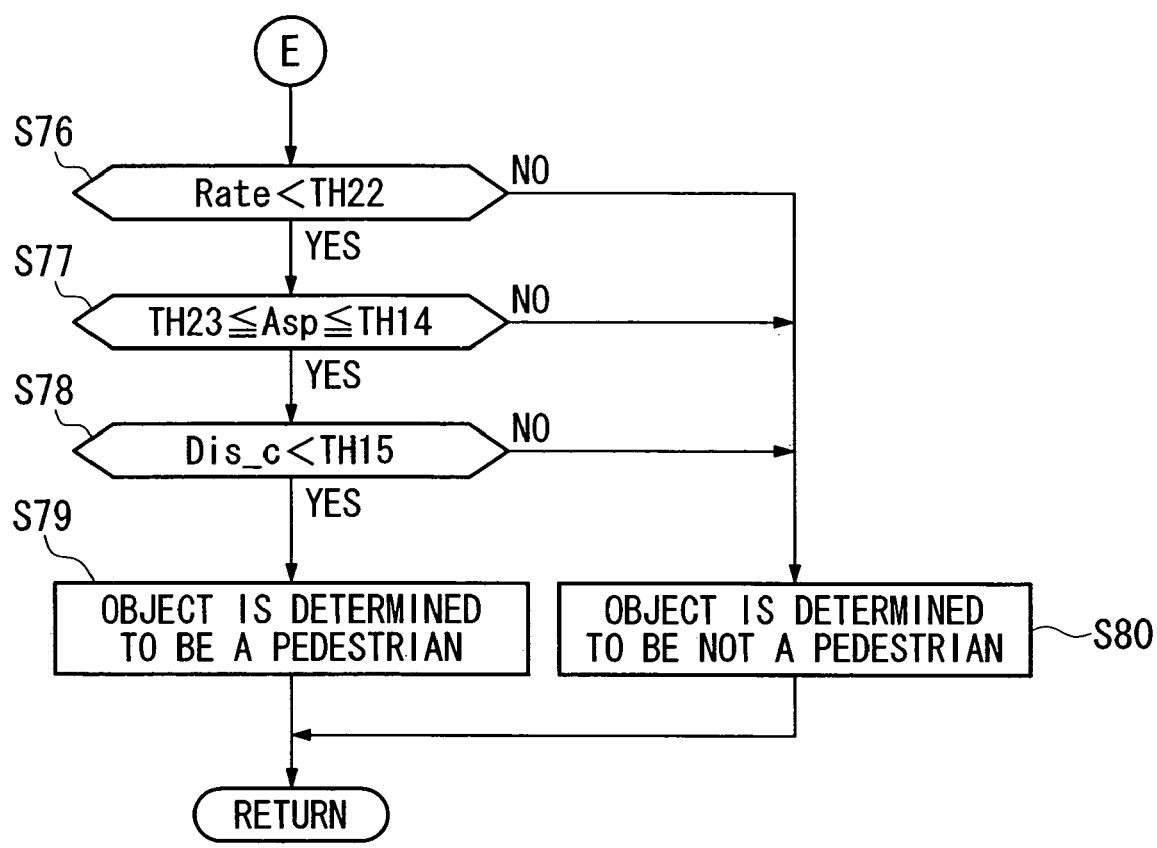
FIG. 13 is a flowchart for explaining a pedestrian determination process according to the embodiment of the present invention.

FIG. 13 is a flowchart showing a procedure for the case where the object is a plurality of pedestrians walking in parallel. If it is determined that the value of RATE, which is the ratio of the surface area of the circumscribed square to that of the binary image within a certain period of time, is less than the threshold value TH22 in step S76 (i.e., "YES" in step S76), it is determined whether the value of Asp, which expresses the aspect ratio of the circumscribed square for the binary object, is equal to or greater than the threshold value TH23 and is equal to or less than the threshold value TH14, i.e., the value appropriate for determining pedestrians walking in parallel (in step S77).

In step S77, if the value of Asp, which expresses the aspect ratio of the circumscribed square for the binary object, is equal to or greater than the threshold value TH23 and is equal to or less than the threshold value TH14 (i.e., "YES" in step S77), it is determined whether the distance Dis_c between the center of gravity in the above-mentioned circumscribed square 102 and the center of gravity G100 in the binary object in the real space is less than the threshold value TH15 (in step S78).

In step S78, if it is determined that the distance Dis_c is less than the threshold value TH15 (i.e., "YES" in step S78), it is determined that the detected object (or the object captured in the area AREA0) is a pedestrian (in step S79), and the pedestrian determination process is terminated. Then, the process proceeds to step S35 shown in FIG. 5 (via "YES" in step S34) to carry out the artificial structure determination process.

On the other hand, in step S76, if it is determined that the value of RATE, which is the ratio of the surface area of the circumscribed square to that of the binary image within a certain period of time, is equal to or greater than the threshold value TH22 in step S76 (i.e., "NO" in step S76), or in step S77, if it is determined that the value of Asp, which expresses the aspect ratio of the circumscribed square for the binary object, is less than the threshold value TH23 or is greater than the threshold value TH14 (i.e., "NO" in step S77), or in step S78, if it is determined that the distance Dis_c is equal to or greater than the threshold value TH15 (i.e., "NO" in step S78), it is considered that the detected object (or the object captured in the area AREA0) is not a pedestrian (in step S80), and the pedestrian determination process is terminated. Then, the process proceeds to step S37 shown in FIG. 5 (via "NO" in step S34) to determine that the object is not an object requiring an alarm to be sounded.

Figure 17:
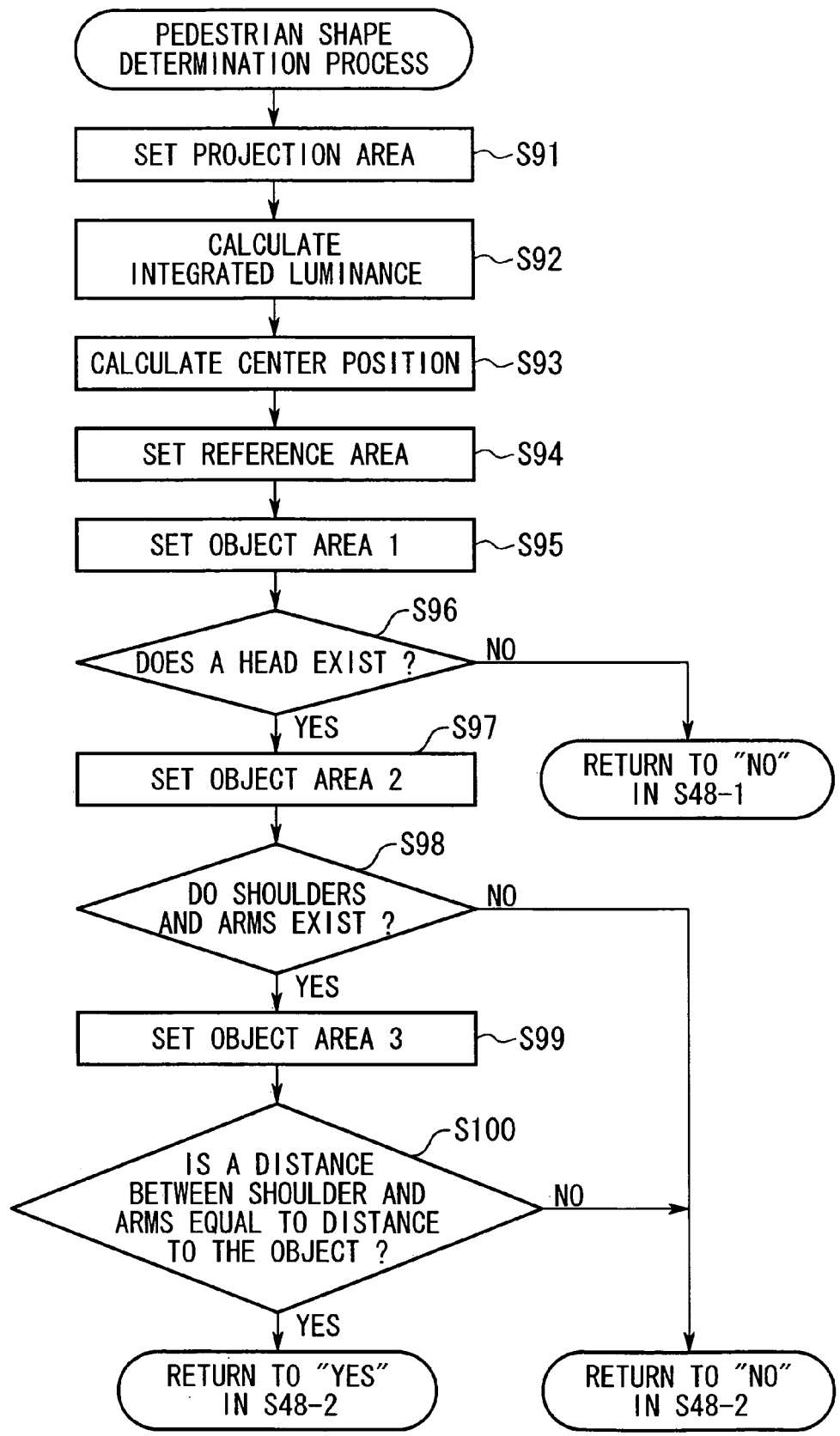
FIG. 17 is a flow chart for determining a pedestrian's shape (head and shoulders) according to the embodiment of the present invention.

Next, a method for determining a pedestrian's shape shown in the steps S48-1 and S48-2 in FIG. 8 is explained with reference to FIGS. 17 to 20. More specifically, a method for determining whether or not a head and an area which is inferred to correspond to the shoulders and the arms of the pedestrian exist in the object which is captured in an area AREA0. FIG. 17 is a flow chart for explaining a pedestrian's shape determination process (determination process for a head and a shoulder section) in the embodiment of the present invention.

Figures 18A, 18B:
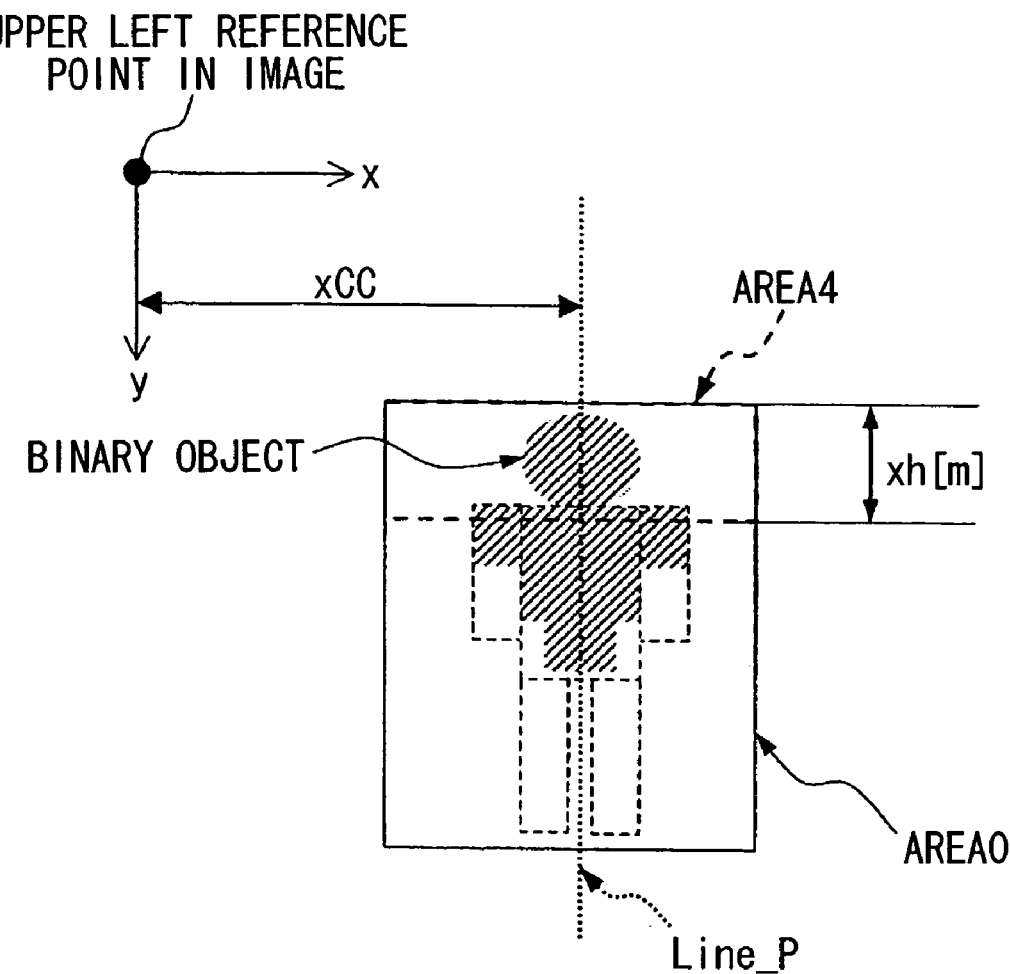
FIGS. 18A and 18B are views for calculating a projection according to the embodiment of the present invention.

In FIG. 17, it is detected whether or not there exists a head of the pedestrian by utilizing a feature in the luminance in each area in the image such that the pedestrian's head has a higher a luminance contrast than the luminance contrast in a background on both sides of the head. That is, as shown in FIGS. 18A and 18B, a projection area AREA4 is established (Step S91) in an area which is indicated "xh [m]" as a real space in an upper portion of an object area AREA 0 which is extracted as a gray scale image. After that, a luminance projection (a distribution of an integrated luminance in a horizontal direction which is formed by integrating the luminance in each pixel in a vertical direction) is calculated in a vertical direction (step S92) so as to detect a horizontal direction coordinate xCC which indicates a maximum peak with reference to an upper left reference point O (step S93).

More specifically, the projection in the projection area AREA4 has a feature that there is a peak thereinside as shown in FIG. 18B. A horizontal coordinate (which is indicated by a broken line Line_P) in the peak position is calculated on an actual projection area AREA4 as shown in FIG. 18A. Accordingly, the horizontal direction coordinate xCC is detected which indicates the maximum peak with reference to the upper left reference point O. Here, it should be noted that a horizontal coordinate for the broken line Line_P which indicates the peak in FIG. 18B indicates the same coordinate as a horizontal coordinate for a broken line Line_P which is shown in FIG. 18A.

Figure 19A:
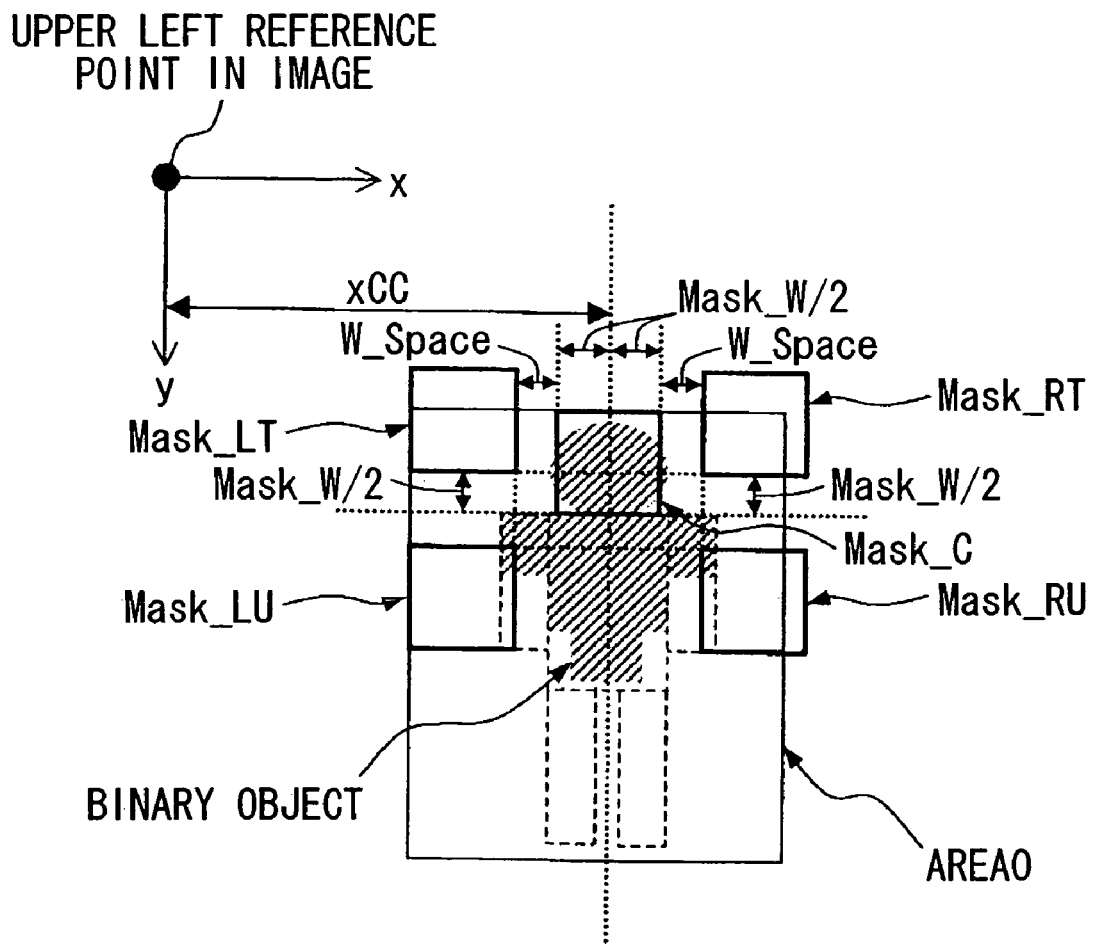
FIGS. 19A and 19B are views for explaining a process for determining a head and shoulders according to the embodiment of the present invention.

As shown in FIG. 19A, a reference area mask Mask_C is established (step S94) in an area which is inferred to correspond to a head position of the pedestrian with reference to the horizontal direction position xCC which is detected in the step S93. Simultaneously, object area masks Mask_LT and Mask_RT for the object area 1 are established (step S95) which are inferred to correspond to a space above the shoulders in both sides of the pedestrian's head.

Figure 19B:
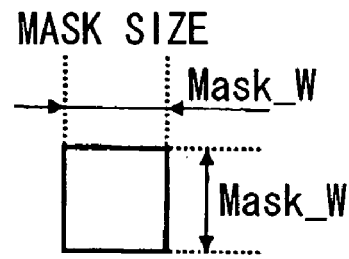

Here, in FIG. 19A, it should be noted that sizes and shapes of the reference area mask Mask_C and the object area masks Mask_LT and Mask_RT are indicated by a square having a member of which length is Mask_w shown in FIG. 19B. Here, it should be noted that a length Mask_W and a length W_Space are indicated by a projected image having a designated size in an actual space. Also, the object area masks Mask_LT and Mask_RT are disposed so as to be shifted from the reference area mask Mask_C by a length such as Mask_W/2 upwardly by taking a fact into account that, in a captured image, the pedestrian may be observed in an inclining manner who does not face directly to a vehicle.

Here, it is possible to dispose the object area mask within a desirable tolerance such that undesirable positioning difference caused by a resolution in the image may be prevented between an actual position of the object and the object on the image by disposing the object area masks Mask_LT and Mask_RT so as to be shifted upwardly from the reference area mask Mask_C. Also, it is possible to prevent an image which is not an object from entering in the object area.

Consequently, an average luminance Mask_C_ave for the reference area mask, and average luminance Mask_LT_ave and Mask_RT_ave for the object area mask are calculated. Simultaneously, it is determined whether or not the pedestrian's head exists (step S96) according to the average luminance in each calculated area.

In the step S96, if the pedestrian's head does not exist (i.e., "NO" in the step S96), the process goes to a step S49 shown in FIG. 8 because it is an identical to a case for "NO" in the step S48-1 shown in FIG. 8. Thus, it is determined that the object which is captured in the area AREA0 is not a pedestrian (step S49); thus, the pedestrian determination process is completed.

Also, in the step S96, if the pedestrian's head exists (i.e., "YES" in the step S96), the process goes to the next step S97.

Here, in the step S96, various conditions are examined by comparing the thresholds such as TH24 and TH25 which are indicated by following relationships (10) to (12).

"Mask_C_ave"–"Mask_LT_ave">TH24  (10)

"Mask_C_ave"–"Mask_RT_ave">TH24  (11)

"Mask_C_ave">TH25  (12)

Next, it is determined whether or not an area exists which indicates the shoulders and arms of the pedestrian by taking features of the luminance in each area (each section) in the image into account that the area which indicates the shoulders and arms of the pedestrian exists so as to be distant from the head by approximately the same distance from the position of the head and the luminance contrast of the shoulders and arms of the pedestrian is different from the luminance contrast in a background on both sides of the head which is positioned above the shoulders of the pedestrian. In this manner, it is possible to further improve an accuracy for detecting the pedestrian. More specifically, as shown in FIG. 19A, other object area masks Mask_LU and Mask_RU as the object area 2 are establsed (step S97) which correspond to the shoulders and arms under the object area masks Mask_LT and Mask_RT which are disposed on both sides of the pedestrian's head which are used for determining a head in the step S96.

The shape and distance for the area which correspond to the shoulders and arms of the pedestrian may vary; therefore, relativity between the object area masks Mask_LT and Mask_RT and the other object area masks Mask_LU and Mask_RU which correspond to the area which correspond to the shoulders and arms are examined; thus, it is determined whether or not there exists an area which corresponds to the shoulders and arms of the pedestrian (step S98).

In the step S98, if the area which corresponds to the shoulders and arms of the pedestrian does not exist (i.e., "NO" in the step S98), the process goes to the step S49 because it is an identical case for "NO" in the step S48-2 shown in FIG. 8. In such a case, it is determined that the object which is captured in the area AREA0 is not a pedestrian (step S49); thus, the pedestrian determination process is completed.

Also in the step S98, if the area which corresponds to the shoulders and arms of the pedestrian exits (i.e., "YES" in the step S98), the process goes to the next step S99.

Here, in the step S98, it should be noted that a relativity error value between the object area masks Mask_LT and the the other object area masks Mask_LU is indicated by an $Error_{13}$ L so as to specifically compare the feature of the luminance in each area (each section) on the image. Also, a relativity error value between the object area mask Mask_RT and the the other object area mask Mask_RU is indicated by an Error_R. Consequently, the threshold values TH26 which are indicated below and the above relativity error are compared.

"Error_R">TH26  (13)

"Error_L">TH26  (14)

If all of the above conditions are satisfied, it is determined that there is a possibility that the area which corresponds to the shoulders and arms exists. Here, it should be noted that an average error for a sum of absolute difference (hereinafter called SAD) is used for the relativity error value.

Figure 20:
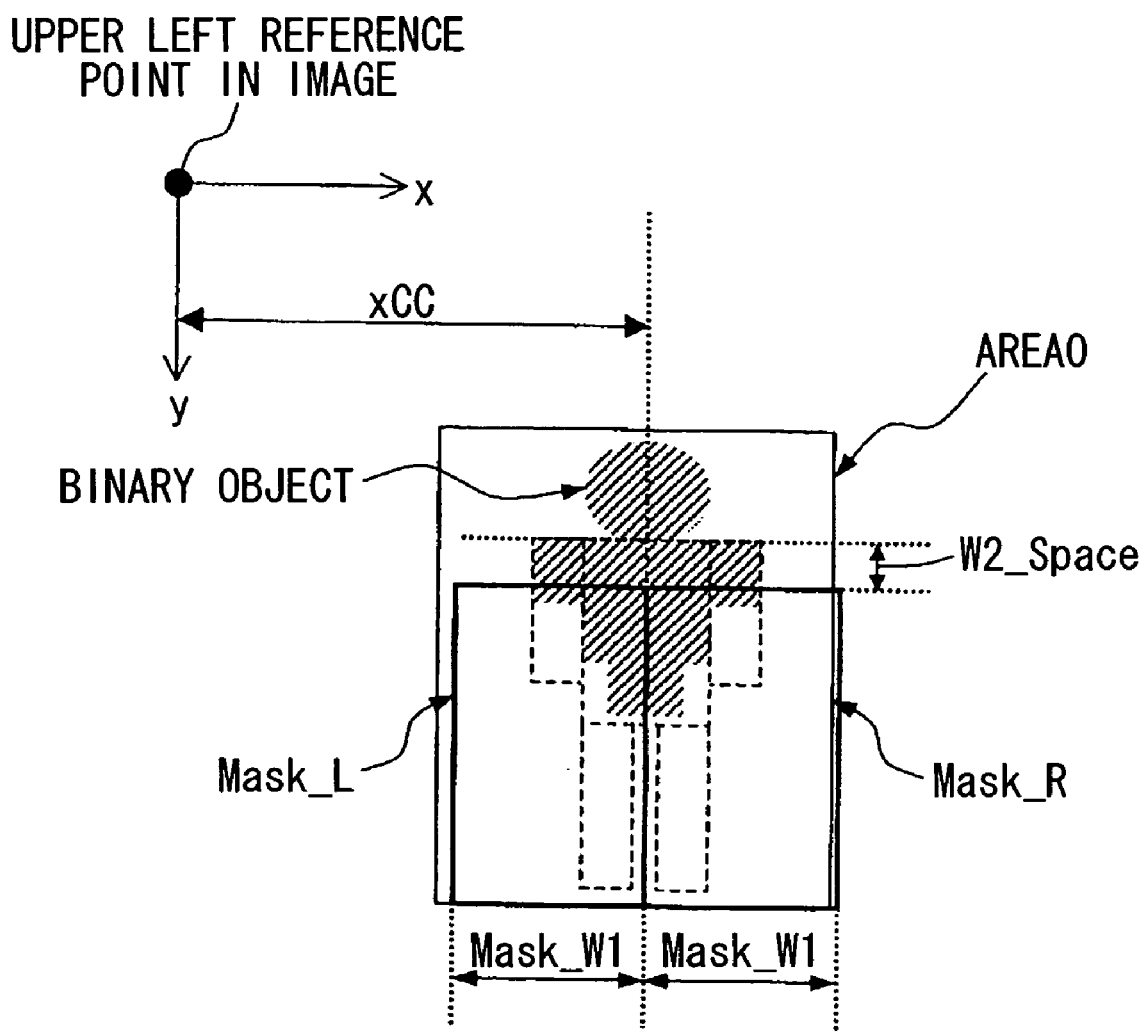
FIG. 20 is a view for explaining shoulders determined according to the embodiment of the present invention.

Next, as shown in FIG. 20, two areas such as Mask_L and Mask_R are established as an object area 3 (step S99) therebeneath on both sides of the targeted object area AREA0 which is extracted as a gray scale image. Disparities for these areas (actual spatial distances) are calculated according to stereo images which are disposed horizontally. Here, it should be noted that projected size for a W2_Space and a Mask_W1 indicate a designated size in the actual space.

Also, it is understood that a distance for an entire pedestrian is equal to a distance to the shoulders and arms. Therefore, if the area which corresponds to the shoulders and arms of the pedestrian exists in such an area, it should be understood that the distance for an entire pedestrian be equal to the distance to such area.

Here, the calculated disparities are established as Mask_L_disparity and Mask_R_disparity. Also, the disparity in the object area in the gray scale image is establised as Mask_disparity. Under the above conditions, if two relationships (15) and (16) which are indicated below satisfy the threshold TH27, it is determined that the object in which there exist the shoulders and arms indicates a pedestrian (step S100).

|"Mask_disparity"–"Mask_L_disparity"|<TH27  (15)

|"Mask_disparity"–"Mask_R_disparity"|<TH27  (16)

Here, the above process from the step S91 to the step S96 corresponds to a method for determining a shape of the pedestrian shown in the step S48-1 in FIG. 8. More specifically, the above process from the step S91 to the step S96 corresponds to a method for determining whether or not an area which is inferred to correspond to the pedestrian's head exists in the object which is captured in the area AREA0. Also, the above process from the step S97 to the step S100 corresponds to a method for determining a shape of the pedestrian shown in the step S48-2 in FIG. 8. More specifically, the above process from the step S97 to the step S100 corresponds to a method for determining whether or not an area which is inferred to correspond to the pedestrian's head exists in the object which is captured in the area AREA0.

Here, in the embodiment of the present invention, the image processing unit 1 comprises a pedestrian's head area calculating unit, a pedestrian's over-shoulder area calculating unit, a pedestrian's shape acknowledging unit, and a pedestrian's shape acknowledging unit. More specifically, the steps in FIG. 17 from S91 to S94 correspond to a pedestrian's head area calculating unit. The step S95 in FIG. 17 corresponds to pedestrian's over-shoulder area calculating unit. Also, the steps S97 and S99 in FIG. 17 correspond to the pedestrian's shape acknowledging unit. The steps S96, S98, and S100 correspond to the pedestrian's shape acknowledging unit.

As explained above, in the device for monitoring around a vehicle according to the embodiment of the present invention, an objects such as a pedestrian is extracted from the gray scale image which is captured by an infra-red ray camera by performing a binary process. After that, an area which is inferred to correspond to the pedestrian's head is establised as a reference area on the gray scale image which contains the binary object by the pedestrian's head area calculating unit. Consequently, the pedestrian's over-shoulder area calculating unit establishes two object areas which are inferred to correspond to spaces above the shoulders of the pedestrian on both sides of the reference area upwardly.

In this manner, the pedestrian's shape acknowledging unit acknowledges an area which corresponds to the head and shoulders of the pedestrian in an image which is captured by an infra-red ray camera by taking a feature into account that the pedestrian's head has a higher luminance contrast than the luminance contrast in a background which is on both sides of the head above the shoulders of the pedestrian.

Furthermore, an object area which is inferred to correspond to an area above the shoulders of the pedestrian and another object area which is established by the pedestrian's shoulder area calculating unit so as to be inferred to correspond to the shoulders and arms of the pedestrian are compared. Thus, the area which corresponds to the shoulders and arms of the pedestrian in an image which is captured by an infra-red ray camera is acknowledged according to a theory that the luminance contrast in the shoulders and arms of the pedestrian is different from the luminance contrast in a background on both sides of the pedestrian's head above the shoulders.

Accordingly, it is understood that a distance for an entire pedestrian is equal to a distance to the shoulders and arms. Therefore, under the condition that the distance for the entire pedestrian and the distance to the shoulders and arms are compared, if a difference between the above distances is less than a certain value, the pedestrian's shape acknowledging unit can acknowledge that the binary object which contains the area which corresponds to the head and shoulders of the pedestrian and the area which corresponds to the shoulders and arms indicate a pedestrian.

Accordingly, if the pedestrian is captured in an image which is captured by an infra-red ray camera in an inclining manner, an area which corresponds to the head and the shoulders of the pedestrian in which an outstanding feature of the pedestrian may be observed is detected from the image as the object by using the two object areas which are disposed above the reference area such that an area which is not a targeted area should not enter in the object area. Next, an area which corresponds to the shoulders and arms in which an outstanding feature of the pedestrian may be observed is detected. Furthermore, it is confirmed that a distance from an area which contains an entire pedestrian is equal to a distance from an area which corresponds to the shoulders and arms of the pedestrian. After that, it is acknowledged that the binary object which contains an area which corresponds to the pedestrian's head and the shoulders and an area which corresponds to the shoulders and arms indicates the pedestrian. In this manner, it is possible to realize an effect in which it is possible to improve an accuracy for detecting the pedestrian.

As explained above, according to the device for monitoring around a vehicle of the present invention, a pedestrian's head area calculating unit establishes an area which is supposed to correspond to a head of the pedestrian as a reference area, and a pedestrian's over-shoulder area calculating unit which establishes two object areas which are supposed to correspond to over-shoulder areas of the pedestrian on both sides of the reference area. By doing this, a pedestrian's shape acknowledging unit acknowledges an area which corresponds to the pedestrian's head and the shoulders in an image which is captured by an infra-red ray camera by utilizing a feature that the pedestrian's head has a higher a luminance contrast than the luminance contrast in a background on both side of the head.

Accordingly, it is possible to realize an effect for improving the accuracy for detecting the pedestrian by detecting an area which corresponds to the head and the shoulders from the image for the object such that an outstanding feature of the pedestrian may be observed.

According to the device for monitoring around a vehicle in another aspect of the present invention, it is possible to prevent an image in an area which is different from the intended area from entering the object area by inclining the object in an image which is captured by an infra-red ray camera.

In this manner, it is possible to realize an effect for improving the accuracy for detecting the pedestrian without receiving an undesirable influence from the pedestrian in an image which is captured by an infra-red ray camera.

According to the device for monitoring around a vehicle in still another aspect of the present invention, an object area which is inferred to correspond to the space above the pedestrian's shoulders and another object area which is inferred to correspond to the pedestrian's shoulders and arms which are established by the pedestrian's shoulder area calculating unit are compared with each other. Consequently, the pedestrian's shape acknowledging unit can acknowledge an area which corresponds to the pedestrian's shoulder and arms in an image which is captured by an infra-red ray camera by utilizing a feature that the pedestrian's shoulders and arms have a different luminance contrast from the luminance contrast in a background on both side of the head.

Accordingly, an area which corresponds to the head and the shoulders of the pedestrian in which an outstanding feature of the pedestrian may be observed is detected from the image as the object. In addition, an area which corresponds to the shoulders and arms in which an outstanding feature of the pedestrian may be observed is further detected from the image as the object. In this manner, it is possible to realize an effect for improving the accuracy for detecting the pedestrian.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discus- sion is intended to be illustrative only; the invention is limited and defined only by the following claims and equivalents thereto.

What is claimed is:

1. A device for monitoring around a vehicle capable of detecting objects present around said vehicle based on an image captured by at least one infrared camera member provided with said vehicle, said device comprising:
   a pedestrian's head area calculating unit which establishes an area which is supposed to correspond to a head of a pedestrian as a reference area;
   a pedestrian's over-shoulder area calculating unit which establishes two object areas which are supposed to correspond to over-shoulder areas of said pedestrian on both sides of said reference area; and
   a pedestrian's shape acknowledging unit which acknowledges said pedestrian who is in said captured image according to a feature in a luminance in said reference area and another feature in a luminance in said object areas.

2. A device for monitoring around a vehicle according to claim 1 wherein said object areas are offset upwardly from said reference area.

3. A device for monitoring around a vehicle according to claim 1 further comprising a pedestrian's shoulder area calculating unit which establishes other object areas for acknowledging said pedestrian's arms and shoulders downwardly to said object areas, respectively, wherein said pedestrian's shape acknowledging unit acknowledges said pedestrian in said captured image according to the other feature in a luminance in said object areas and another feature in a luminance in said other object areas.

4. A device for monitoring around a vehicle capable of detecting objects present around said vehicle by extracting an object based on an image captured by at least one infrared camera member provided with said vehicle so as to acknowledge the object as a pedestrian, said device comprising:
   a pedestrian's head area calculating unit which establishes an area which is supposed to correspond to a head of said pedestrian as a reference area;
   a pedestrian's over-shoulder area calculating unit which establishes two object areas which are supposed to correspond to over-shoulder areas of said pedestrian on both sides of said reference area;
   a pedestrian's shape acknowledging unit which acknowledges said pedestrian who is in said captured image according to a feature in a luminance in said reference area and another feature in a luminance in said object areas, and
   a display device which displays an object which is acknowledged as a pedestrian by the pedestrian's shape acknowledging unit distinguishably from an object which is not acknowledged as a pedestrian.

5. A device for monitoring around a vehicle capable of detecting objects present around said vehicle by extracting an object based on an image captured by at least one infrared camera member provided with said vehicle so as to acknowledge the object as a pedestrian, said device comprising:
   a pedestrian's head area calculating unit which establishes an area which is supposed to correspond to a head of said pedestrian as a reference area;
   a pedestrian's over-shoulder area calculating unit which establishes two object areas which are supposed to correspond to over-shoulder areas of said pedestrian on both sides of said reference area;
   a pedestrian's shape acknowledging unit which acknowledges said pedestrian who is in said captured image according to a feature in a luminance in said reference area and another feature in a luminance in said object areas,
   an alarm determination device which determines whether or not an alarm should be generated based on the object which is acknowledged as a pedestrian by the pedestrian's shape acknowledging unit, and
   a display device which displays an object which is acknowledged as a pedestrian by the pedestrian's shape acknowledging unit distinguishably from an object which is not acknowledged as a pedestrian.

6. A device for monitoring around a vehicle according to claim 4 wherein the object areas are offset upwardly relative to the reference area.

7. A device for monitoring around a vehicle according to claim 4 further comprising a pedestrian's shoulder area calculating unit which establishes other object areas for acknowledging said pedestrian's arms and shoulders downwardly to said object areas, respectively, wherein said pedestrian's shape acknowledging unit acknowledges said pedestrian in said captured image according to the other feature in a luminance in said object areas and another feature in a luminance in said other object areas.

8. A device for monitoring around a vehicle according to claim 4 wherein said display device displays the object, which is acknowledged as a pedestrian by the pedestrian's shape acknowledging unit, distinguishably in an emphasized manner.

9. A device for monitoring around a vehicle according to claim 3 wherein said feature in said luminance is specified according to at least one of an average luminance, a luminance contrast, and a relativity error value between said object areas and said other object areas.

10. A device for monitoring around a vehicle, according to claim 5, wherein the object areas are offset upwardly relative to the reference area.

11. A device for monitoring around a vehicle according to claim 5 further comprising a pedestrian's shoulder area calculating unit which establishes other object areas for acknowledging said pedestrian's arms and shoulders downwardly to said object areas, respectively, wherein said pedestrian's shape acknowledging unit acknowledges said pedestrian in said captured image according to the other feature in a luminance in said object areas and another feature in a luminance in said other object areas.

12. A device for monitoring around a vehicle according to claim 5 wherein said display device displays the object, which is acknowledged as a pedestrian by the pedestrian's shape acknowledging unit, distinguishably in an emphasized manner.

13. A device for monitoring around a vehicle according to claim 7 wherein said feature in said luminance is specified according to at least one of an average luminance, a luminance contrast, and a relativity error value between said object areas and said other object areas.

14. A device for monitoring around a vehicle according to claim 11 wherein said feature in said luminance is specified according to at least one of an average luminance, a luminance contrast, and a relativity error value between said object areas and said other object areas.

15. A device for monitoring around a vehicle according to claim 1 wherein said pedestrian's shape acknowledging unit acknowledges said pedestrian who is in said captured image based on contrast of the feature in the luminance in said reference area and the other feature in the luminance in said object areas.

16. A device for monitoring around a vehicle according to claim 4 wherein said pedestrian's shape acknowledging unit acknowledges said pedestrian who is in said captured image based on contrast of the feature in the luminance in said reference area and the other feature in the luminance in said object areas.

17. A device for monitoring around a vehicle according to claim 5 wherein said pedestrian's shape acknowledging unit acknowledges said pedestrian who is in said captured image based on contrast of the feature in the luminance in said reference area and the other feature in the luminance in said object areas.

* * * * *